US012212735B2

(12) United States Patent
Iwakiri

(10) Patent No.: US 12,212,735 B2
(45) Date of Patent: Jan. 28, 2025

(54) DISPLAY CONTROL APPARATUS, DISPLAY CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yoshiki Iwakiri, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/981,316

(22) Filed: Nov. 4, 2022

(65) Prior Publication Data

US 2023/0059798 A1 Feb. 23, 2023

Related U.S. Application Data

(63) Continuation of application No. 16/885,071, filed on May 27, 2020, now Pat. No. 11,528,472, which is a continuation of application No. PCT/JP2018/041926, filed on Nov. 13, 2018.

(30) Foreign Application Priority Data

Nov. 28, 2017 (JP) .................................. 2017-228335

(51) Int. Cl.
*H04N 7/18* (2006.01)
*G08B 21/18* (2006.01)
*H04N 17/00* (2006.01)

(52) U.S. Cl.
CPC ......... *H04N 17/002* (2013.01); *G08B 21/182* (2013.01); *H04N 7/181* (2013.01)

(58) Field of Classification Search
CPC ...... H04N 17/00; H04N 17/002; H04N 7/181; H04N 13/282; H04N 13/117; H04N 7/18; H04N 5/44; G08B 21/182
USPC .......................... 348/187, 51, 159, 143, 559
See application file for complete search history.

(56) References Cited

U.S. PATENT DOCUMENTS

| 6,002,995 A | * | 12/1999 | Suzuki | H04N 23/661 348/E7.086 |
| 6,014,163 A | * | 1/2000 | Housekeeper | H04N 13/239 348/E13.016 |
| 6,597,393 B2 | * | 7/2003 | Kato | G08B 13/19645 348/211.6 |

(Continued)

FOREIGN PATENT DOCUMENTS

| JP | H11331818 A | 11/1999 |
| JP | 2011228845 A | 11/2011 |

*Primary Examiner* — Trang U Tran
(74) *Attorney, Agent, or Firm* — Canon U.S.A., Inc. IP Division

(57) ABSTRACT

An information display apparatus 400 obtains information about a plurality of apparatuses for obtaining a plurality of images captured from a plurality of directions for use in generating a virtual viewpoint image corresponding to a specified viewpoint. Furthermore, the information display apparatus 400 identifies an apparatus in an abnormal state among the plurality of apparatuses based on the obtained information. The information display apparatus 400 then causes the display unit 404 to display information indicating one or a plurality of apparatuses, among the plurality of apparatuses, that are in a predetermined relationship with the apparatus in the abnormal state.

15 Claims, 25 Drawing Sheets

(56) References Cited

U.S. PATENT DOCUMENTS

| | | | | |
|---|---|---|---|---|
| 8,953,046 B2* | 2/2015 | Kotani | ............... | G06T 15/205 348/159 |
| 2019/0114185 A1* | 4/2019 | Nakajima | ............... | G06F 3/124 |

* cited by examiner

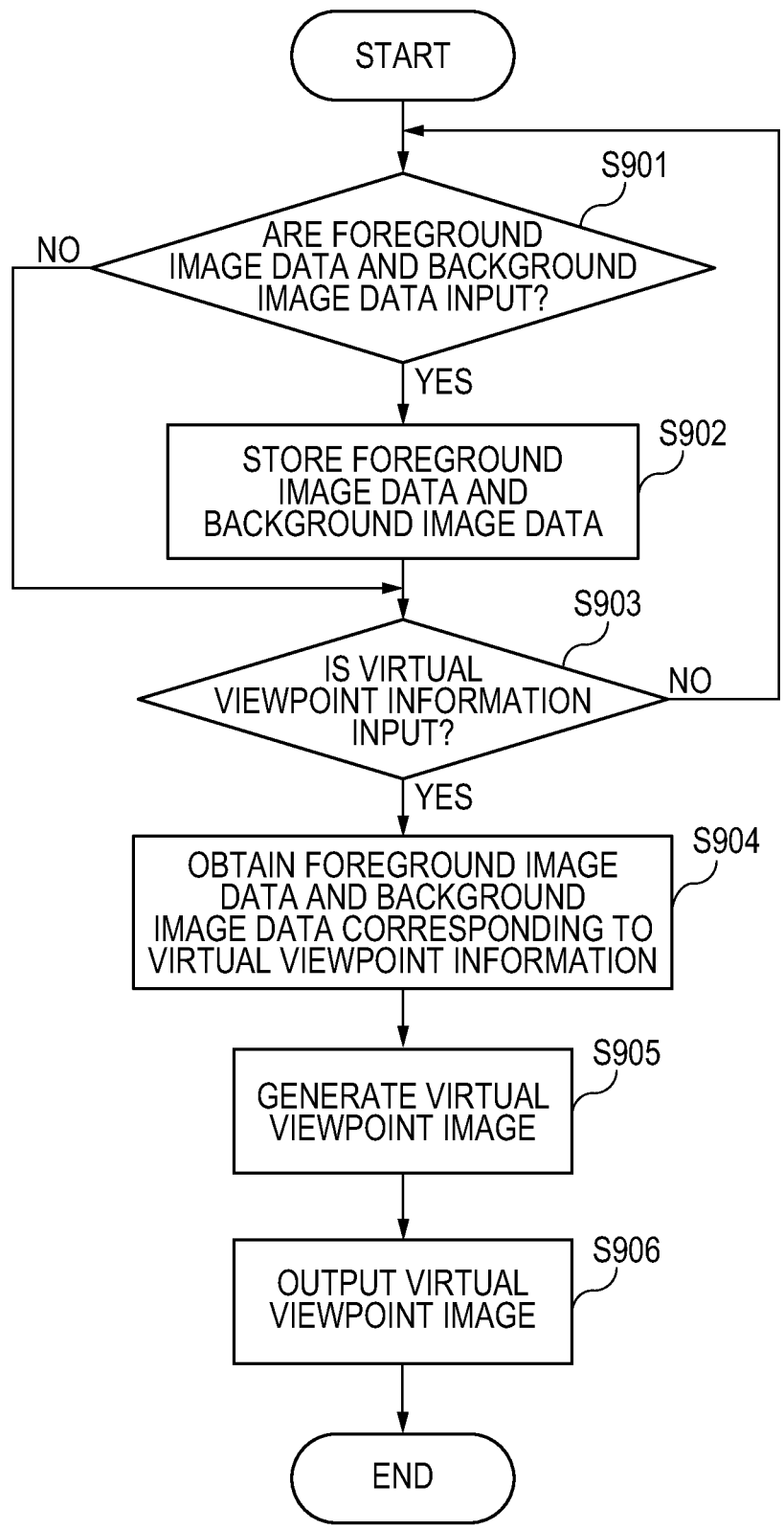

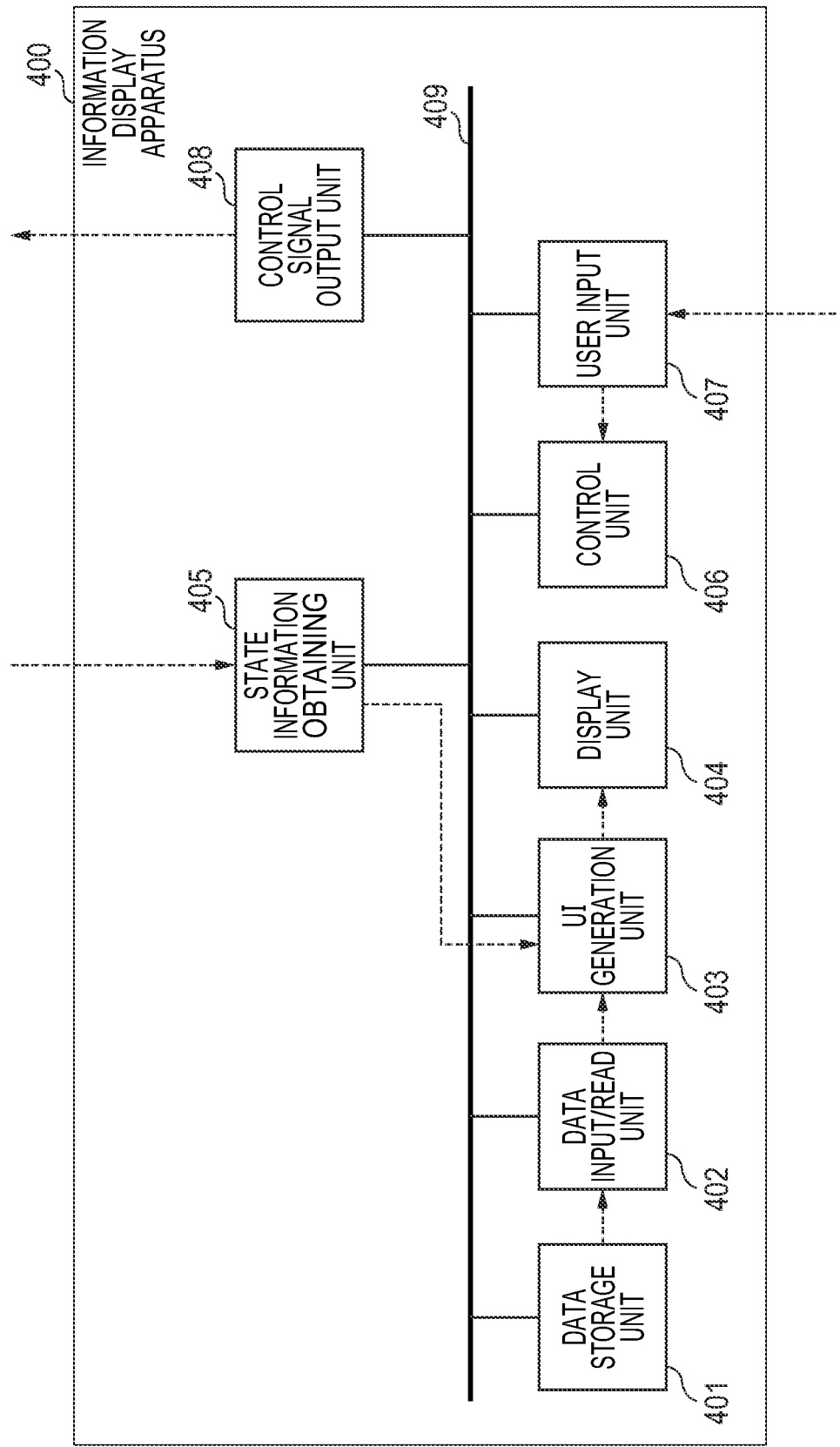

FIG. 8

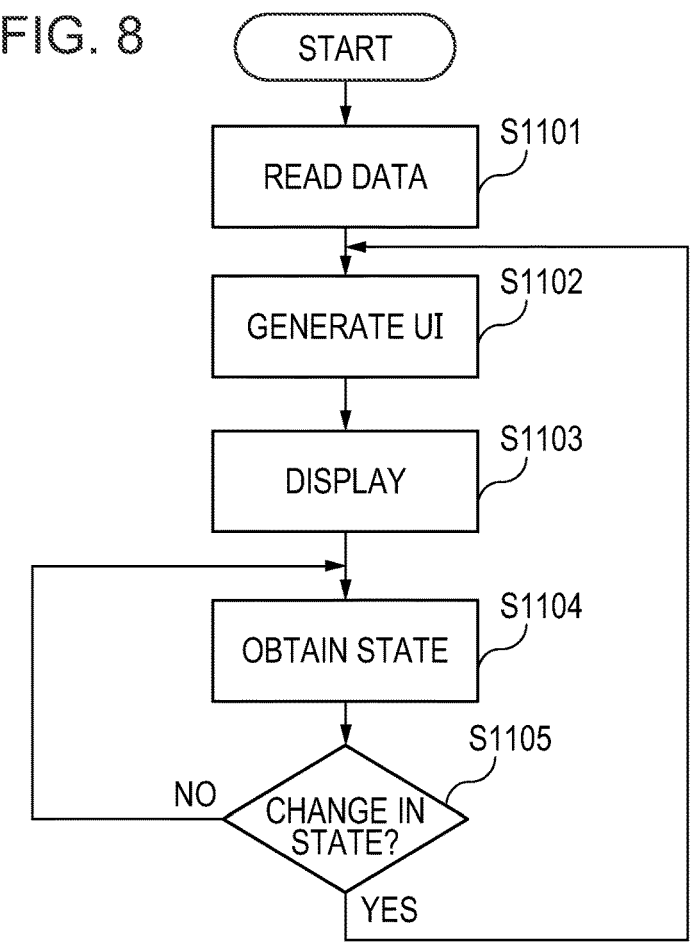

FIG. 9A

| IMAGE CAPTURING APPARATUS IDENTIFICATION | CONNECTION GROUP | CONNECTION DESTINATION | INSTALLATION AREA INFORMATION | INSTALLATION COORDINATE INFORMATION (x, y) | IMAGING TARGET AREA |
|---|---|---|---|---|---|
| IMAGE CAPTURING APPARATUS 100-1 | L1 | IMAGE CAPTURING APPARATUS 100-2 | R1 | x1, y1 | V1 |
| IMAGE CAPTURING APPARATUS 100-2 | L1 | IMAGE CAPTURING APPARATUS 100-3 | R1 | x2, y2 | V2 |
| IMAGE CAPTURING APPARATUS 100-3 | L1 | IMAGE CAPTURING APPARATUS 100-4 | R1 | x3, y3 | V1 |
| IMAGE CAPTURING APPARATUS 100-4 | L1 | IMAGE CAPTURING APPARATUS 100-5 | R2 | x4, y4 | V2 |
| IMAGE CAPTURING APPARATUS 100-5 | L1 | IMAGE CAPTURING APPARATUS 100-6 | R2 | x5, y5 | V1 |
| IMAGE CAPTURING APPARATUS 100-6 | L1 | IMAGE CAPTURING APPARATUS 100-7 | R2 | x6, y6 | V2 |
| ... | ... | ... | ... | ... | ... |

| IMAGING TARGET AREA IDENTIFICATION | AREA CENTER COORDINATES | EFFECTIVE AREA INFORMATION (RADIUS) |
|---|---|---|
| V1 | x7, y7 | Vr7 |
| V2 | x8, y8 | Vr8 |
| ... | ... | ... |

| INSTALLATION AREA IDENTIFICATION | VERTEX COORDINATES | | | | |
|---|---|---|---|---|---|
| R1 | x9, y9 | x10, y10 | x11, y11 | x12, y12 | ... |
| R2 | x13, y13 | x14, y14 | x15, y15 | x16, y16 | ... |
| R3 | x17, y17 | x18, y18 | x19, y19 | x20, y20 | ... |
| ... | ... | ... | ... | ... | ... |

FIG. 18A

| IMAGING TARGET GROUP | CONNECTION STATUS | ERROR STATUS | BYPASS STATUS | OUTPUT STATUS | CAMERA PLATFORM | MICROPHONE | OUTPUT | IRIS | ISO | SHUTTER SPEED | NO FILTER |
|---|---|---|---|---|---|---|---|---|---|---|---|
| V1: | CONNECTED | NO | NO | NO | NO | NO | BEING OUTPUT | * | 800 | 1/100 | 2stop |
| V2: | NOT CONNECTED | * | NO | NO | NO | NO | BEING OUTPUT | F4.0 | 800 | 1/100 | 2stop |

FIG. 18B

| IMAGING TARGET GROUP | CONNECTION STATUS | ERROR STATUS | BYPASS STATUS | OUTPUT STATUS | CAMERA PLATFORM | MICROPHONE | OUTPUT | IRIS | ISO | SHUTTER SPEED | NO FILTER |
|---|---|---|---|---|---|---|---|---|---|---|---|
| IMAGE CAPTURING APPARATUS 100-1 | CONNECTED | NO | NO | NO | NO | NO | BEING OUTPUT | F4.0 | 800 | 1/100 | 2stop |
| IMAGE CAPTURING APPARATUS 100-2 | CONNECTED | TEMPERATURE ERROR | NO | NO | NO | NO | BEING OUTPUT | F4.0 | 800 | 1/100 | 2stop |
| ... | ... | ... | ... | ... | ... | ... | ... | ... | ... | ... | ... |
| IMAGE CAPTURING APPARATUS 100-n | CONNECTED | NO | NO | NO | NO | NO | BEING OUTPUT | F4.0 | 800 | 1/100 | 2stop |

FIG. 21
| GROUP | DISPLAY ERROR |
|---|---|
| CONNECTION GROUP | ON |
| INSTALLATION AREA GROUP | OFF |
| IMAGING TARGET AREA GROUP | OFF |
FIG. 22A
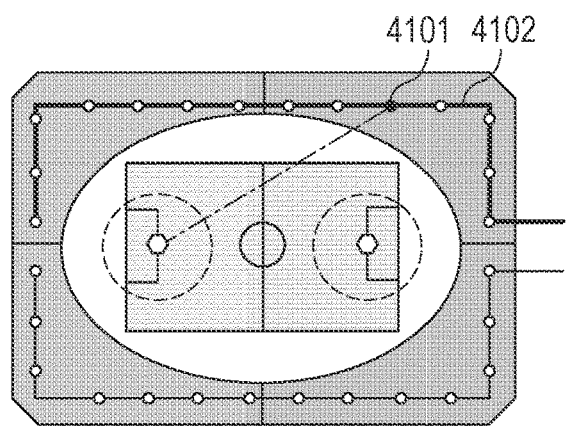
FIG. 22B
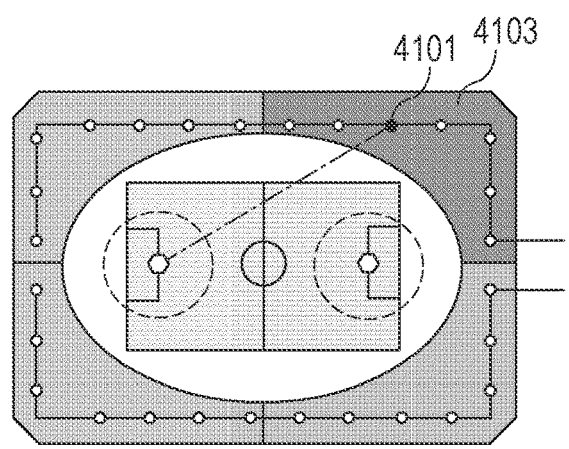

FIG. 24
| FUNCTION | MODE |
|---|---|
| ERROR DISPLAYING | DISPLAY IMAGE CAPTURING APPARATUS |
| | DISPLAY CONNECTION GROUP |
| | DISPLAY IMAGING TARGET AREA |
| | DISPLAY ALL |
FIG. 25A
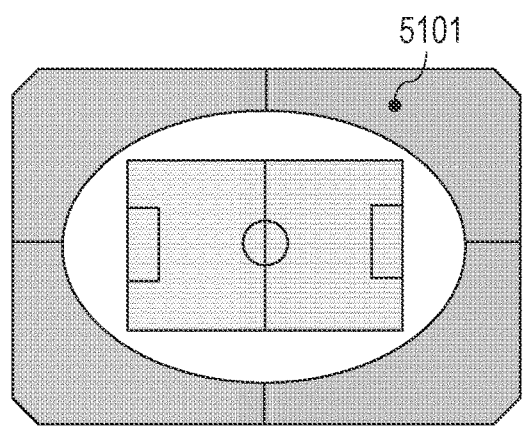
FIG. 25B
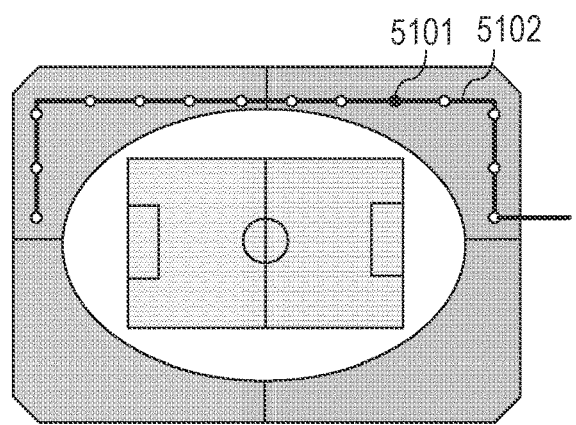

DISPLAY CONTROL APPARATUS, DISPLAY CONTROL METHOD, AND NON-TRANSITORY COMPUTER-READABLE STORAGE MEDIUM

CROSS-REFERENCE TO RELATED APPLICATIONS

This application is a Continuation of U.S. patent application Ser. No. 16/885,071, filed on May 27, 2020, which is a Continuation of International Patent Application No. PCT/JP2018/041926, filed Nov. 13, 2018, which claims the benefit of Japanese Patent Application No. 2017-228335, filed Nov. 28, 2017, both of which are hereby incorporated by reference herein in their entirety.

BACKGROUND

Field

The present disclosure relates to a system for generating a virtual viewpoint image.

Background Art

Conventionally, a technique has been proposed to generate a virtual viewpoint image such that images of a subject are captured in synchronization from a plurality of directions by a plurality of image capturing apparatuses set a different positions, and a virtual viewpoint image is formed using a plurality of captured images (multiple viewpoint images) obtained as a result of capturing the images. The virtual viewpoint image generated in this way is an image representing a view seen from a virtual viewpoint that is not limited to the installation positions of the image capturing apparatuses.

PTL 1 discloses a technique in which a user selects a desired viewpoint based on one or more images, and a virtual viewpoint image is generated from the images and information on the selected viewpoint. PTL 1 also discloses a UI (user interface) for allowing a user to select a desired viewpoint.

CITATION LIST

Patent Literature

PTL 1: Japanese Patent Laid-Open No. 2014-215828

In various systems including a plurality of apparatuses, when one of components thereof is in an abnormal state, information regarding the component in the abnormal state may be displayed to inform a user of the state of the system state. However, in a system for generating a virtual viewpoint image, a situation may occur in which it is not sufficient to simply display information regarding a component in an abnormal state.

For example, when at least one of a plurality of image capturing apparatuses included in the system is in an abnormal state in which a malfunction occurs or it is not capable of normally capturing an image or outputting a captured image, a problem may occur such as a deterioration in the quality of a generated virtual viewpoint image. In such a situation, depending on the position relationship or the connection relationship between the image capturing apparatus in the abnormal state and other image capturing apparatuses, it may be allowed or not allowed to continue the generation of the virtual viewpoint image, or there may be a difference in the number of image capturing apparatuses that are to be adjusted. That is, there are cases where simply indicating the apparatus in the abnormal state does not allow the user to easily know the degree of the influence of the abnormality on the quality of the virtual viewpoint image, the number of processes required to recover from the abnormal state, and the like. On the other hand, if the user can easily know the degree of the influence of the abnormality, for example, the user can quickly take appropriate measures such as repair or adjustment of the image capturing apparatus, which makes it possible to suppress a problem such as a reduction in quality of the virtual viewpoint image.

In view of the above problems, it is an object of the present disclosure to provide a technique for more appropriately informing a user of a state of a system for generating a virtual viewpoint image.

SUMMARY

In order to solve the above problems, a display control apparatus according to the present disclosure is configured, for example, as described below. That is, the display control apparatus includes an obtaining unit configured to obtain information regarding states of a plurality of apparatuses for obtaining a plurality of images captured from a plurality of directions for use in generating a virtual viewpoint image, an identification unit configured to identify, among the plurality of apparatuses, an apparatus that is in an abnormal state, based on the information obtained by the obtaining unit, a display control unit configured to perform control to cause a display unit to display information indicating one or a plurality of apparatuses, among the plurality of apparatuses, that are in a predetermined relationship with the apparatus identified by the identification unit as being in the abnormal state.

Further features of the present disclosure will become apparent from the following description of exemplary embodiments with reference to the attached drawings.

BRIEF DESCRIPTION OF THE DRAWINGS

FIG. 6 is a flow chart illustrating an example of an operation of an image generation apparatus.

FIG. 7 is a diagram illustrating an example of a functional configuration of an information display apparatus.

FIG. 8 is a flow chart illustrating an example of an operation of an information display apparatus.

FIG. 9A is a diagram illustrating an example of data stored in a data storage unit of an information display apparatus.

FIG. 18A is a diagram illustrating an example in which states of image capturing apparatus are displayed in a list.

FIG. 18B is a diagram illustrating an example in which states of image capturing apparatus are displayed in a list.

FIG. 21 is a diagram illustrating an example of a setting list relating to a group error display.

FIG. 22A is a diagram illustrating an example of a display image displayed by an information display apparatus.

FIG. 22B is a diagram illustrating an example of a display image displayed by an information display apparatus.

FIG. 24 is a diagram illustrating an example of a setting list for setting an error display mode.

FIG. 25A is a diagram illustrating an example of a display image displayed by an information display apparatus.

FIG. 25B is a diagram illustrating an example of a display image displayed by an information display apparatus.

DESCRIPTION OF THE EMBODIMENTS

Embodiments are described below with reference to drawings. In the embodiments described below, explanations are given by way of example for a case where on an image schematically representing a stadium that includes an imaging target area and that is an installation location of an image capturing apparatuses.

Figure 1:
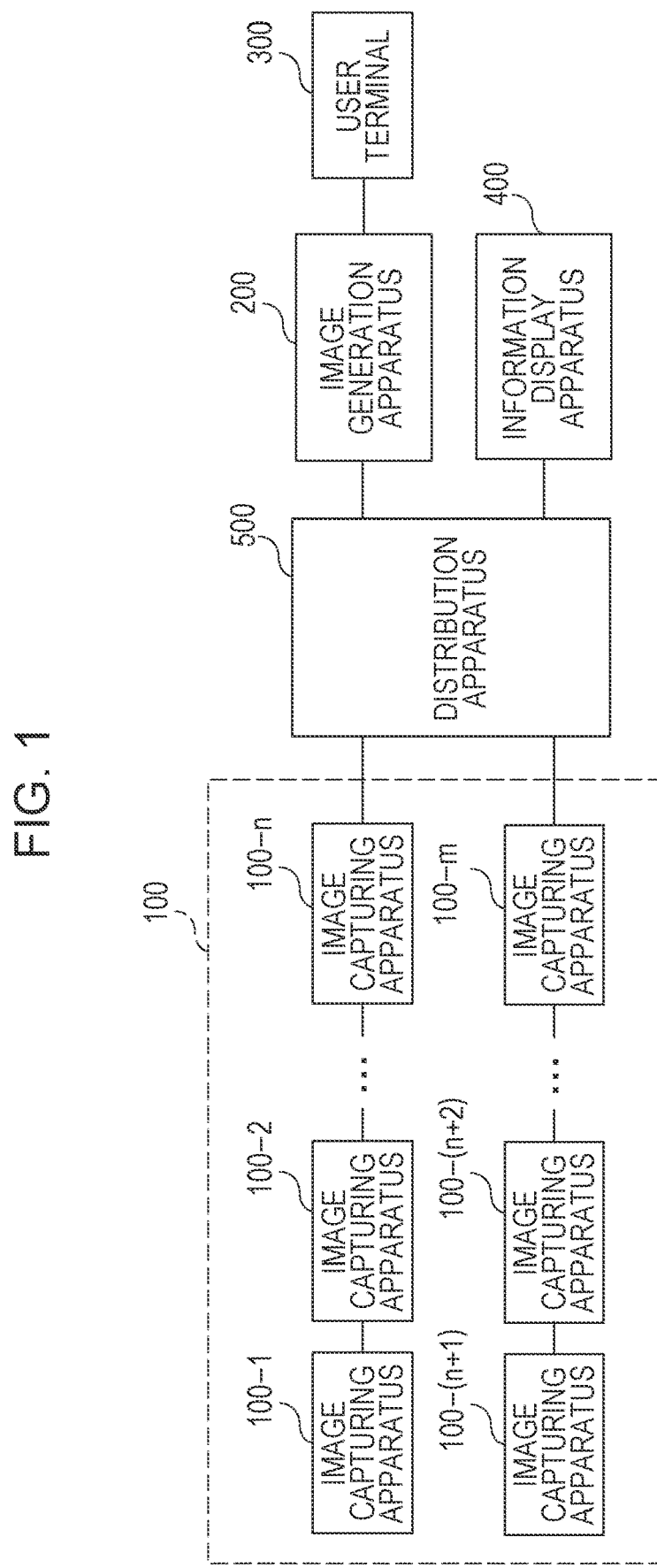
FIG. 1 is a diagram illustrating a configuration of an image processing system.

FIG. 1 is a diagram illustrating an example of a configuration of an image processing system that generates a virtual viewpoint image according to the present embodiment. The image processing system according to the present embodiment includes an image capturing system 100 including a plurality of image capturing apparatuses 100-1, 100-2, . . . 100-m, an image generation apparatus 200, a user terminal 300, an information display apparatus 400, and a distribution apparatus 500. Each apparatus is communicably connected to another apparatus via a transmission cable for transmitting images and control information. Specific examples of the transmission cables include ETHERNET (registered trademark) such as GBE (Gigabit Ethernet), 10 GBE, or the like according to an IEEE standard. However, the transmission cable is not limited to these, and other types of cables may be used. Each apparatus may perform wireless communication.

The image capturing system 100 includes m image capturing apparatuses (image capturing apparatuses 100-1, 100-2, . . . , 100-m) that capture images from different directions thereby obtaining a plurality of captured images for use in generating a virtual viewpoint image. Hereinafter, when a description is general and not about a specific image capturing apparatus, the image capturing apparatuses 100-1, 100-2, . . . , and 100-m will be generically referred to as an image capturing apparatus 100-x. Note that m and n (described later) in the present embodiment each take an integer value.

Image capturing apparatuses 100-x located adjacent to each other (for example, an image capturing apparatus 100-1 and an image capturing apparatus 100-2) are interconnected via a transmission cable. An image capturing apparatus 100-x transmits a captured image and state information of the image capturing apparatus 100-x to the image generation apparatus 200 and the information display apparatus 400. The state information will be described later. In FIG. 1, the image capturing apparatus 100-1 is interconnected with the image capturing apparatus 100-2. The image capturing apparatus 100-2 is also interconnected to another image capturing apparatus (not shown) located adjacent to the image capturing apparatus 100-2 as well as the image capturing apparatus 100-1. An image capturing apparatus 100-n is interconnected to image capturing apparatuses (not shown) located adjacent to the image capturing apparatus 100-*n*. The image capturing apparatus 100-*n* is also interconnected to the distribution apparatus 500. A plurality of image capturing apparatuses 100-1 to 100-*n* are connected in series in the form of a daisy chain. A plurality of image capturing apparatuses 100-(*n*+1) to 100-*m* are also connected in series in the form of the daisy chain.

In the present embodiment, as described above, the image processing system include two connection groups in which apparatuses are connected in the form of daisy chain. Note that the number of connection groups included in the image processing system is not limited to two, but the image processing system may include only one connection group, or may include three or more connection groups. In the present embodiment, each connection group is a group of apparatuses which are connected directly to each other or indirectly via another apparatus. Note that there may be a connection group including a single apparatus. In the present embodiment, an explanation is focused on an example in which connection groups are connected in a daisy chain configuration. However, the connection configuration is not limited to this example. For example, a star connection may be employed.

Figure 2:
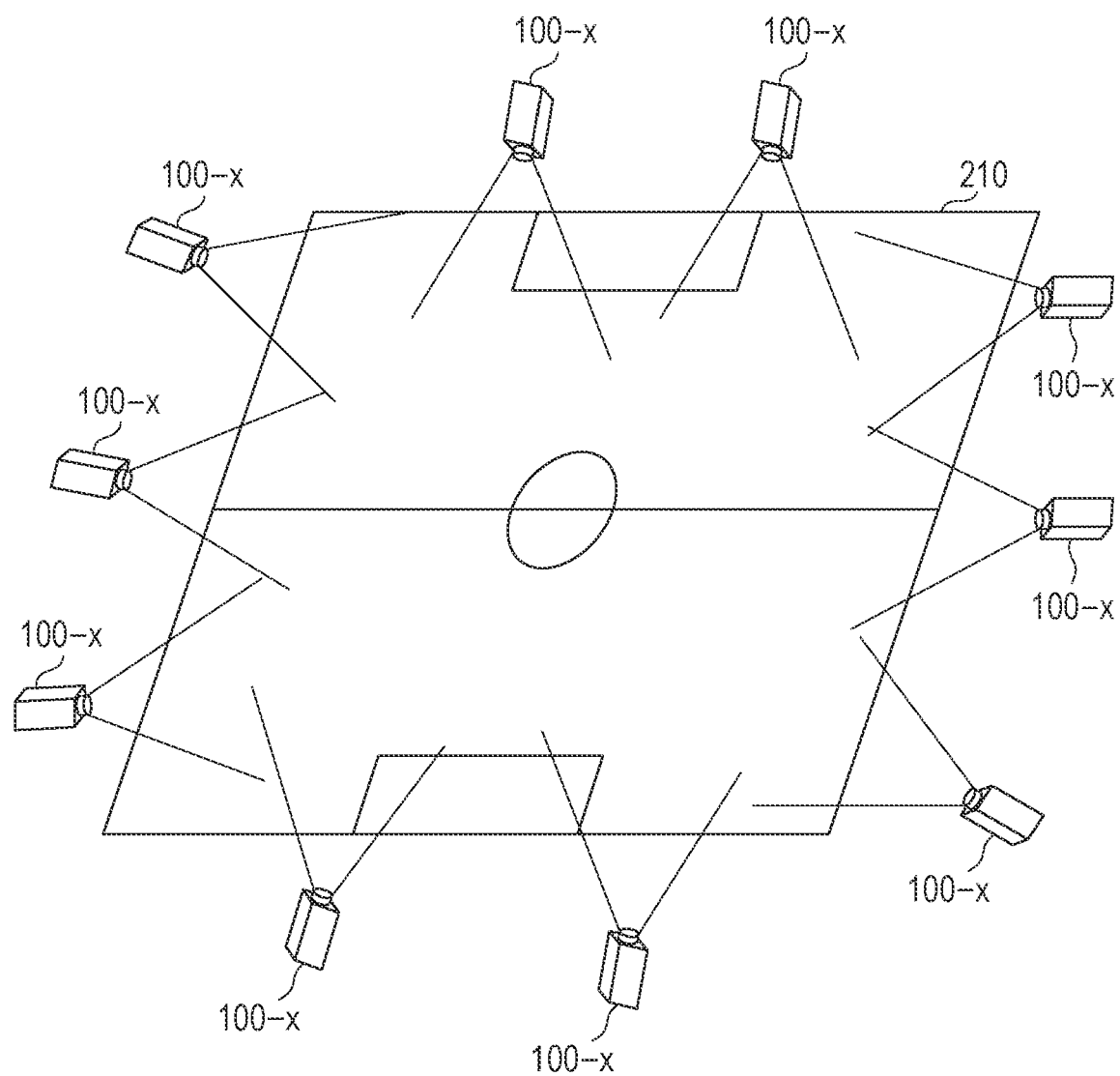
FIG. 2 is a diagram illustrating an arrangement of image capturing apparatus.

The image capturing apparatuses 100-*x* are disposed so as to surround a stadium such as a soccer field or a specific subject. FIG. 2 is a diagram illustrating an example of an arrangement of image capturing apparatuses 100-*x*. In the example shown in FIG. 2, the plurality of image capturing apparatuses 100-*x* are arranged such that the stadium 210 imaged by the plurality of image capturing apparatuses 100-*x*. Note that the plurality of image capturing apparatuses 100-*x* may capture images not of the whole of but part of the stadium 210. Furthermore, the plurality of image capturing apparatuses 100-*x* do not need to completely surround a subject. The installation location of the image capturing system 100 is not limited to a stadium. The image capturing system 100 may be installed in a theater or on a live stage.

The plurality of image capturing apparatuses 100-*x* each are, for example, a digital camera. The plurality of image capturing apparatuses 100-*x* capture images at substantially the same timing according to a synchronization signal supplied from a synchronization apparatus (not shown). The images captured by the image capturing apparatuses 100-*x* are transmitted to the image generation apparatus 200 and the information display apparatus 400 via the transmission cable and the distribution apparatus 500. The image capturing apparatus 100-*x* may be a camera configured to capture a still image, a camera configured to capture a moving image, or a camera capable of capture both a still image and a moving image. In the present embodiment, the term "image" will be used to describe both a still image and a moving image unless otherwise noted.

Note that in the present embodiment, a description thereof is given by way of example for mainly a case where each image capturing apparatus 100-*x* is directly connected to another image capturing apparatus 100-*x* thereby transmitting an image, but the connection method is not limited to this example. For example, instead of connecting the plurality of image capturing apparatuses 100-*x*, a plurality of processing apparatuses (for example, m processing apparatuses) may be connected in each connection group. In this case, each image capturing apparatus 100-*x* may transmit a captured image to a processing apparatus corresponding to the image capturing apparatus 100-*x*, and each processing apparatus may transmit the captured image received from the image capturing apparatus 100-*x* or an image obtained by performing image processing on the captured image to the image generation apparatus 200 and the information display apparatus 400. That is, in this case, the plurality of processing apparatuses obtain a plurality of images (obtained by capturing from a plurality of directions by the plurality of image capturing apparatuses 100-*x*) used in generating a virtual viewpoint image, and the plurality of processing apparatuses transmit the obtained images to the image generation apparatus 200 or the information display apparatus 400.

The image generation apparatus 200 is interconnected to the image capturing apparatuses 100-*x* via the distribution apparatus 500. The image generation apparatus 200 is also interconnected to the user terminal 300 and the information display apparatus 400. The image generation apparatus 200 stores images captured by the image capturing apparatuses 100-*x*. When the image generation apparatus 200 receives virtual viewpoint information input by a user by performing an operation on the user terminal 300 to specify the position and/or the direction of the virtual viewpoint, the image generation apparatus 200 generates a virtual viewpoint image according to the virtual viewpoint information using the images captured by the plurality of image capturing apparatuses 100-*x*. The virtual viewpoint information is information indicating the position of the viewpoint and the direction of the line of sight for generating a virtual viewpoint image. In other words, the virtual viewpoint information is information indicating a position and a posture of a virtual camera corresponding to the virtual viewpoint image.

The image generation apparatus 200 transmits the generated virtual viewpoint image to the user terminal 300. Note that the virtual viewpoint information includes at least the position information and the direction information related to the specified viewpoint. The position information is information indicating, for example, a relative position with respect to a predetermined position such as the center of the stadium 210 which is the imaging target (the position of the viewpoint as measured in the bock-and-forth, right-and-left, and up-and-down directions from the predetermined reference position). The position information may be information represented in absolute coordinates. The direction information is information indicating, for example, an orientation seen from the predetermined position (represented by three angles from an axis in the back-and-forth direction, an axis in the right-and-left direction, and an axis in the up-and-down direction, respectively, defined in a three-dimensional rectangular coordinate system whose origin is taken at the predetermined position). The direction information may be information indicating an absolute direction.

The image generation apparatus 200 is, for example, a server apparatus, and has a database function, an image processing function, and/or the like. In the database used by the image generation apparatus 200, an image of the stadium in a state in which there is no particular subject such as a player, for example, as in the state of the stadium before a competition is started is captured and stored as background image data in advance. The background image data is used in performing a foreground-background separation to extract a specific subject from the captured image.

The user terminal 300 includes a controller for operation. For example, the user terminal 300 accepts, based on an operation performed on the controller by a user, an instruction to move the position of the virtual viewpoint, change the line-of-sight direction of the virtual viewpoint, and switch the viewpoint, and the user terminal 300 transmits, as virtual viewpoint information, a signal corresponding to the content of the accepted instruction to the image generation apparatus 200. Furthermore, when the user terminal 300 receives a virtual viewpoint image from the image generation apparatus 200, the user terminal 300 displays the received virtual viewpoint image on a display screen provided on the user terminal 300. The virtual viewpoint image may be a still image or a moving image. The user terminal 300 is, for example, a PC or a tablet device. The controller includes, for example, at least one of the following: a mouse; a keyboard; a 6-axis controller; and a touch panel.

The information display apparatus 400 is interconnected to the image capturing apparatuses 100-x and the image generation apparatus 200 via the distribution apparatus 500. The information display apparatus 400 obtains a captured image captured by the image capturing apparatus 100-x and state information related to the image capturing apparatus 100-x, and the information display apparatus 400 displays an image according to the obtained state information on a display screen (a display unit 404) which will be described later. The information display apparatus 400 also obtains information indicating the installation positions of the image capturing apparatus 100-x, identification information of the image capturing apparatus 100-x, information indicating an imaging target area included in the imaging area, And information indicating the connection relationship among the plurality of image capturing apparatuses, and the information display apparatus 400 displays the image on the display screen according to the obtained information. The information display apparatus 400 may obtain information related to a group to which each image capturing apparatus 100-x belongs, and may display the image on the display screen according to the obtained information. The information display apparatus 400 may obtain various kinds of information described above from image capturing apparatuses 100-x, or a database or the like provided in another apparatus, or may obtain based on an inputting operation performed by a user on the information display apparatus 400.

In the present embodiment, a group to which an image capturing apparatus 100-x of interest belongs is a group of one or more apparatuses with which the image capturing apparatus 100-x of interest has a predetermined relationship. The predetermined relationship is, for example, a relationship in terms of at least one of the following: the connection relationship; the installation relationship; and the imaging target area. However, the relationship is not limited to these. One or more apparatuses having a predetermined relationship in terms of the apparatus type, setting information, or the like may be grouped in one group.

The information display apparatus 400 also receives state information related to the image generation apparatus 200 and displays the received state information on the display screen. The information displayed on the information display apparatus 400 is viewed by a monitoring operator of the image processing system. The monitoring operator recognizes the state of the image capturing system 100 or the image generation apparatus 200 from the image displayed on the display screen of the information display apparatus 400, and controls each apparatus, for example, via the information display apparatus 400 or issues an instruction to an operator who controls each apparatus. The distribution apparatus 500 distributes the captured images received from the image capturing apparatuses 100-x to the image generation apparatus 200 and the information display apparatus 400.

Figure 3:
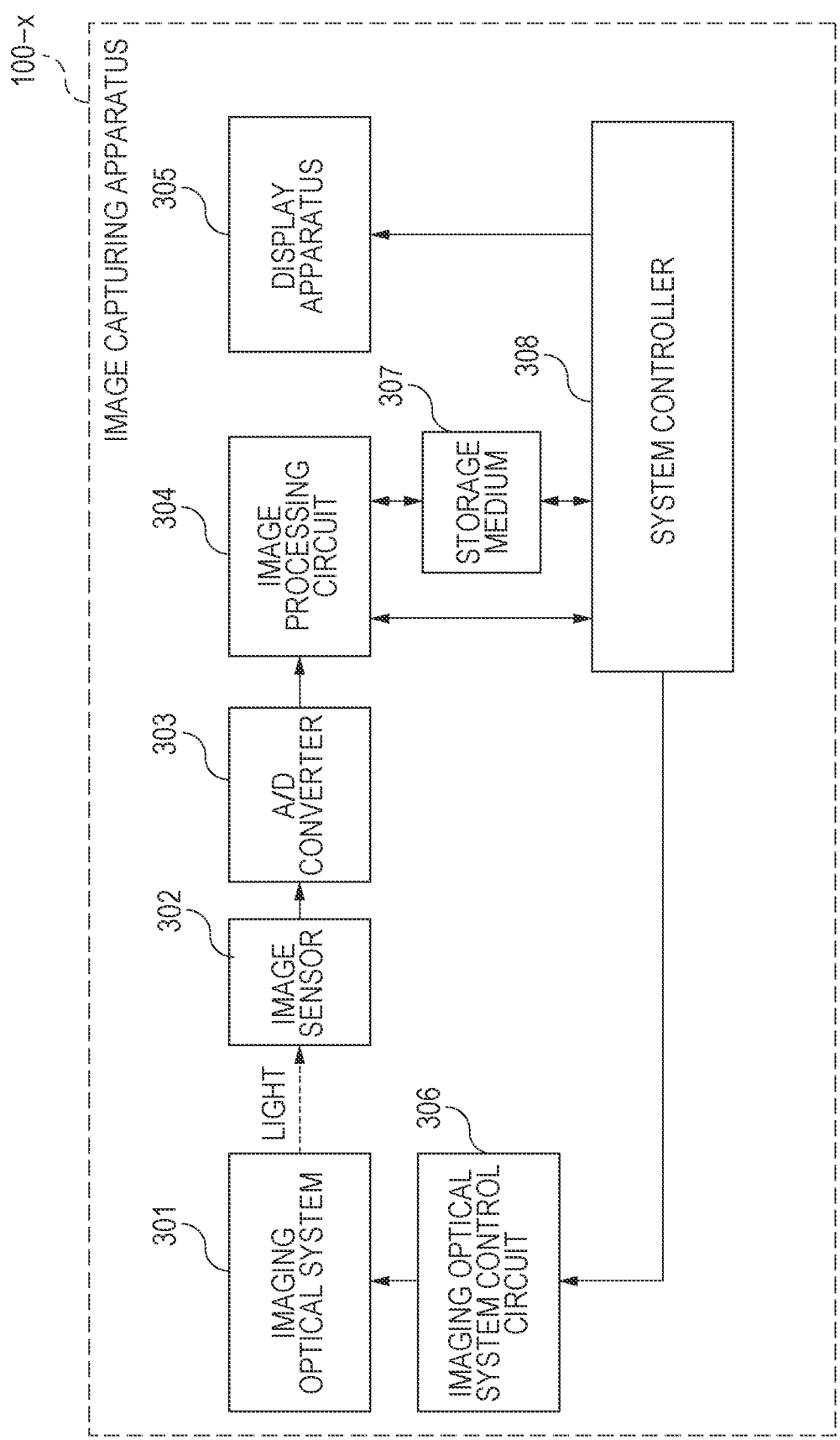
FIG. 3 is a diagram illustrating a hardware configuration of an image capturing apparatus.

Next, an example of a configuration of the image capturing apparatus 100-x is described. FIG. 3 is a diagram illustrating an example of a hardware configuration of the image capturing apparatus 100-x. An imaging optical system 301 (an optical lens system) focuses light from a subject so as to form an image on an image sensor 302. The image sensor 302 converts the light forming the image into an electric signal, and outputs the resultant electric signal to an A/D converter 303. The A/D converter 303 converts the input electric signal into a digital signal, and provides the converted digital signal to an image processing circuit 304. The image sensor 302 is a photoelectric conversion device that converts an optical signal of an image formed on a light reception plane into an electric signal for each light reception pixel at a corresponding position.

A system controller 308 includes, for example, a CPU, a ROM, a RAM, and the like. The system controller 308 controls the image capturing apparatus 100-x by executing a computer program stored in the ROM. For example, the system controller 308 transmits an image stored in a storage medium 307 to the information display apparatus 400 or the like by controlling a communication unit (not shown) provided in the image capturing apparatus 100-x.

The image processing circuit 304 performs various image processing on the digital signal (the image signal) input from the A/D converter 303. The image processing includes, for example, white balance adjustment, color correction, and gamma correction. The image signal subjected to image processing by the image processing circuit 304 is stored in the storage medium 307 or displayed by the display apparatus 305. The image processing circuit 304 extracts a specific subject such as a player from an image captured during a competition at a stadium 210 among captured images supplied from the imaging unit 102. An imaging optical system control circuit 306 drives a lens or the like included in the imaging optical system 301 based on a control signal supplied from the system controller 308.

Note that the illustrated configuration of the image capturing apparatus 100-x is merely an example. The configuration does not necessarily need to include all these elements, and may include another element. For example, the display apparatus 305 is not an essential component of the image capturing apparatus 100-x. For example, part of the constituent elements shown in the figure may be realized as an apparatus separate from the image capturing apparatus 100-x. For example, as described above with reference to FIG. 1, the image capturing apparatus 100-x may transmit a captured image to a processing apparatus corresponding to the image capturing apparatus 100-x. Each processing apparatus may obtain an image based on imaging performed by the image capturing apparatus 100-x and transfers the obtained image to the information display apparatus 400 or the like. In this case, the processing apparatus may include the image processing circuit 304 and the storage medium 307.

Figure 4:
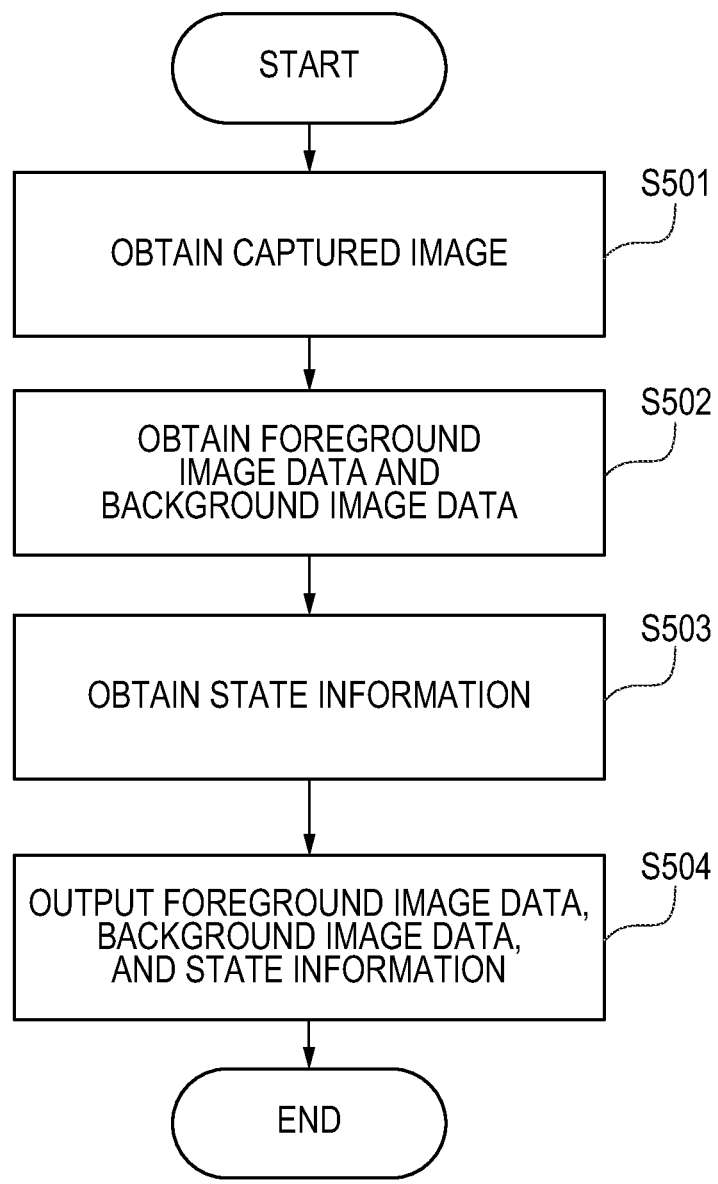
FIG. 4 is a flow chart illustrating an example of an operation of an image capturing apparatus.

FIG. 4 is a flow chart illustrating an example of an operation of the image capturing apparatus 100-x according to the present embodiment. Note that the flow chart shown in FIG. 4 is executed, for example, each time the image capturing apparatus 100-x obtains a captured image. The process shown in the flow chart in FIG. 4 is realized by the system controller 308 by performing a calculation of information or controlling each piece of hardware. Note that at least some steps in the flow chart in FIG. 4 may be executed by dedicated hardware. The dedicated hardware is, for example, an ASIC (Application Specific Integrated Circuit) or an FPGA (Field-Programmable Gate Array).

In S501, the image capturing apparatus 100-x obtains a captured image. More specifically, incident light coming from an imaging target is focused into an image by adjusting the zoom and the focus of the lens, and an exposure operation is performed for the formed image of incident light thereby converting the image into an electric signal. Furthermore, the image capturing apparatus 100-x also performs signal processing, such as a correction of a loss of an output from the sensor and a correction of a variation in lens optical characteristics, on the converted signal. The image capturing apparatus 100-x then converts the captured image into a format such as RAW, JPEG (JOINT PHOTOGRAPHIC EXPERTS GROUP), or BMP (BITMAP IMAGE) based on the result of the signal processing.

Note that the image capturing apparatus 100-x may receive a parameter for the lens adjustment, a parameter for the exposure adjustment, and the like from an external apparatus (for example, the information display apparatus 400), and may change the setting according to the received parameters and obtain a captured image. Examples of parameters input from the outside include parameters in terms of the zoom, the focus, the aperture value (iris), the ISO, the shutter speed, and ND (Neutral Density) filter switching.

In S502, the image capturing apparatus 100-x extracts a specific subject (foreground) such as a player from the image captured during the competition at the stadium 210 from among the obtained captured images thereby obtaining "foreground image data". Note that the image capturing apparatus 100-x obtains, in advance, "background image data" by capturing an image of the stadium 210 in a state in which no specific subject exists as in a state before the competition is started. The background image data may also be obtained by deleting specific subjects from the captured image and employing the remaining image as the background image data. Hereinafter, a captured image that has not been separated into a foreground image and a background image is referred to as "pre-separation image data" to distinguish it from "foreground image data" and "background image data".

As a method of separating a foreground image of a specific subject, for example, it is allowed to use a method of image processing including an object extraction process for extracting a foreground image as a subject. Object extraction is performed by extracting a difference between a captured image and a background image. The foreground image may be an image of not only a player playing a game but also, for example, another specific person (for example, at least one of a backup player, a director, and a referee). The foreground image may be an image of an object such as a ball or a goal, for which an image pattern is predetermined. Another method of extracting a foreground image may be, for example, to detect a moving object.

In S503, the image capturing apparatus 100-x obtains the state information of the image capturing apparatus 100-x itself. The state information includes at least one of the following:

Communication connection state (connected, disconnected, etc.) of the image capturing apparatus 100-x Imaging state (in the middle of imaging operation, in preparation operation, in power-off operation, etc.) of the image capturing apparatus 100-x Operation state (zoom operation, focus operation, iris setting, power OFF/ON, etc.) of the image capturing apparatus 100-z Output state (outputting foreground image data or background image data to the image generation apparatus 200, etc.) of the image capturing apparatus 100-x Error status (normal, temperature error, lens error, etc.) of the image capturing apparatus 100-X Configuration of the image capturing apparatus 100-x (in terms of whether a camera platform, a microphone, a zoom lens, and the like are attached)

Imaging parameters of the image capturing apparatus 100-x (iris, shutter speed, white balance, exposure value, ISO sensitivity, zoom, focus, ND filter, imaging mode, etc.)

In S504, the image capturing apparatus 100-x outputs "foreground image data" and "background image data" obtained in S502 to the image generation apparatus 200 and the information display apparatus 400 at a predetermined frame rate via the distribution apparatus 500. The image capturing apparatus 100-x also outputs the state information obtained in S503 to the information display apparatus 400 via another image capturing apparatus 100-x and the distribution apparatus 500. The outputting is performed at timing according to the frame rate, or when the image capturing apparatus 100-x starts or when a change occurs in the state of the image capturing apparatus 100-x.

Note that part of the process shown in FIG. 4 may be executed by another apparatus. For example, the foreground image separation in S502 may be executed by a processing apparatus by obtaining a captured image from the image capturing apparatus 100-x and executing the foreground image separation. Furthermore, outputting of various data in S504 may be executed by a processing apparatus connected to the image capturing apparatus 100-x.

Figure 5:
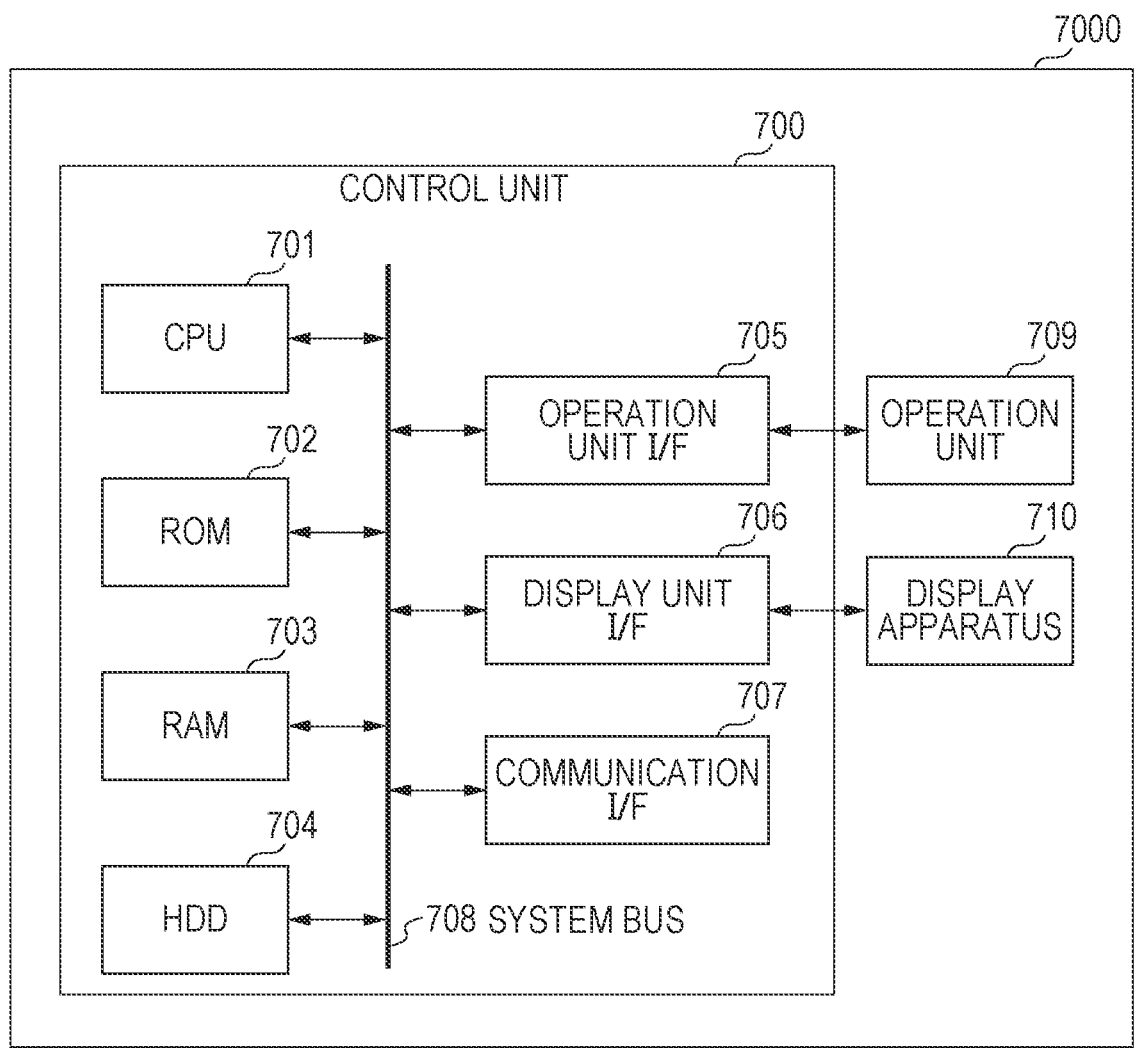
FIG. 5 is a diagram illustrating a hardware configuration of an apparatus.

Next, examples of configurations of the image generation apparatus 200, the information display apparatus 400, and the user terminal 300 are described below. FIG. 5 is a diagram illustrating examples of hardware configurations of the image generation apparatus 200, the information display apparatus 400, and the user terminal 300. An apparatus 7000 (which is the user terminal 300, the image generation apparatus 200, or the information display apparatus 400) includes a controller unit 700, an operation unit 709, and a display apparatus 710.

The controller unit 700 includes a CPU 701. The CPU 701 starts an OS (Operating System) using a boot program stored in the ROM 702. The CPU 701 executes, on this OS, an application program stored in an HDD (Hard Disk Drive) 704. The CPU 701 realizes various processes by executing application programs. A RAM 703 is used as a work area of the CPU 701. The HDD 704 stores application programs and the like.

The CPU 701 is interconnected to a ROM 702, a RAM 703, an operation unit I/F 705, a display unit I/F 706, And a communication I/F 707 via a system bus 708. The operation unit I/F 705 is an interface with the operation unit 709. The operation unit I/F 705 transmits, to the CPU 701, information input by a user via the operation unit 709. The operation unit 709 includes, for example, a mouse, a keyboard, and the like. The display unit I/F 706 outputs image data to be displayed on the display apparatus 710 to the display apparatus 710. The display apparatus 710 includes a computer display. The communication I/F 707 is, for example, an Ethernet (registered trademark) interface for performing communication, and is connected to a transmission cable. The communication I/F 707 inputs and outputs information from or to an external apparatus via the transmission cable. The communication I/F 707 may be a circuit or an antenna for performing wireless communication. The apparatus 7000 is also capable of performing display control to display an image on an external display apparatus connected via a cable or a network. In this case, the apparatus 7000 realizes display control by outputting display data to the display apparatus. Note that all of elements shown in FIG. 5 are not necessarily required in the user terminal 300, the image generation apparatus 200, or the information display apparatus 400. For example, in the image generation apparatus 200, the display apparatus 710 is not an essential element.

FIG. 6 is a flow chart illustrating an example of an operation of the image generation apparatus 200 according to the present embodiment. The process shown in FIG. 6 is realized by the CPU 701 shown in FIG. 5 by reading out various programs stored in the ROM 702 and executing control of various units. The process shown in FIG. 6 is executed, for example, periodically after a generation instruction instructing to generate a virtual viewpoint image is input to the image generation apparatus 200. Note that at least some steps in the flow chart in FIG. 6 may be executed by dedicated hardware. The dedicated hardware is, for example, an ASIC or an FPGA.

In S901, the image generation apparatus 200 obtains foreground image data and background image data output from the image capturing apparatus 100-x via the distribution apparatus 500. Note that the foreground image data and the background image data may be input at different frame rates. In a case where the foreground image data and the background image data are not input from the image capturing apparatus 100-x, S902 is skipped and the process proceeds to S903 which will be described later. In S902, the image generation apparatus 200 stores the input foreground image data and background image data in a database.

In S903, the image generation apparatus 200 determines whether virtual viewpoint information has been obtained. In a case where a result of the determination indicates that virtual viewpoint information has not been obtained, the process returns to S901. On the other hand, in a case where virtual viewpoint information has been input, the process proceeds to S904 in which the image generation apparatus 200 obtains foreground image data and background image data corresponding to the virtual viewpoint information from the database. The virtual viewpoint information is obtained, for example, such that the user terminal 300 accepts an instruction to change the position of the virtual viewpoint, change the direction of line of sight, and switch the viewpoint according to an operation by the user via the controller connected to the user terminal 300 as described above. The user terminal 300 transmits a transmission signal indicating a content of the instruction to the image generation apparatus 200. The image generation apparatus 200 converts the transmission signal input, in the above-described manner, from the user terminal 300 to virtual viewpoint information thereby obtaining the virtual viewpoint information.

In S905, the image generation apparatus 200 combines the obtained foreground image data and background image data by image processing thereby generating a virtual viewpoint image. As for a method of generating the virtual viewpoint image, for example, a model-based rendering (MBR) method may be used. In the MBR method, a virtual viewpoint image is generated using a three-dimensional model generated based on a plurality of captured images of a subjected captured from a plurality of directions. More specifically, the MBR method generates an image as would be seen from a virtual viewpoint using a three-dimensional shape (model) of a target scene obtained by a three-dimensional shape reconstruction method such as a visual volume intersection method or Multi-View-Stereo (MVS). The method of generating the virtual viewpoint image is not limited to the method using the MBR method. For example, a rendering method other than the MBR such as image-based rendering may be used. In S906, the image generation apparatus 200 converts the generated virtual viewpoint image to a transmission signal that is allowed to be transmitted to the user terminal 300, and transmits the resultant transmission signal to the user terminal 300.

The user terminal 300 accepts specifying a position of the virtual viewpoint or a direction thereof from the user, and receives a virtual viewpoint image corresponding to the specified viewpoint from the image generation apparatus 200. The received virtual viewpoint image is displayed on a display screen provided on the user terminal 300. Thus, the user is allowed to view a content represented for the viewpoint specified by the operation performed by the user. As described above, the user terminal 300 is, for example, a PC, a tablet device, or the like, and the controller is, for example, a mouse, a keyboard, a 6-axis controller, a touch panel, or the like. By operating such a controller, the user is allowed to display a virtual viewpoint image viewed from an arbitrary viewpoint on the display screen provided on the user terminal 300.

Next, an example of a configuration of the information display apparatus 400 is described. FIG. 7 is a diagram illustrating an example of a functional configuration of the information display apparatus 400 according to the present embodiment. FIG. 8 is a flow chart illustrating an example of an operation of the information display apparatus 400 according to the present embodiment. The information display apparatus 400 is an example of a display apparatus configured to display a state of the image capturing apparatus 100-x or the image generation apparatus 200 based on information stored in the data storage unit 401 described later and information obtained by the state obtaining unit 405. The information display apparatus 400 includes a data storage unit 401, a data input/read unit 402, a UI generation unit 403, a display unit 404, a state obtaining unit 405, a control unit 406, a user input unit 407, and a control signal output unit 408. These units are connected to each other via an internal bus 409 such that data can be transmitted and received to/from each other under the control of the control unit 406. Note that the data storage unit 401 shown in FIG. 7 is realized by the HDD 704 shown in FIG. 5, and the data input/read unit 402, the UI generation unit 403, and the control unit 406 shown in FIG. 7 are realized by the CPU 701 shown in FIG. 5. The state obtaining unit 405 and the control signal output unit 408 shown in FIG. 7 are realized by the communication I/F 707 shown in FIG. 5, and the display unit 404 shown in FIG. 7 is realized by the display unit I/F 706 and the display apparatus 710.

The process shown in FIG. 8 and the process (described later) performed by the information display apparatus 400 is realized by the CPU 701 shown in FIG. 5 by reading out various programs stored in the ROM 702 and executing control of various units. The process shown in FIG. 8 is started at a timing when the information display apparatus 400 is set to a mode in which an UI image is displayed. However, the timing of starting the process shown in FIG. 8 is not limited to this example. Note that at least some steps shown in the flow chart in FIG. 8 or at least some steps shown in a flow chart (described later) performed by the information display apparatus 400 may be executed by dedicated hardware. The dedicated hardware is, for example, an ASIC or an FPGA. The components of the information display apparatus 400 are described below one by one for each component.

The data storage unit 401 stores data necessary for the UI generation unit 403 to display UI. The data includes at least one of the following:

Layout data of the stadium 210

Identification information of the image capturing apparatus 100-*x*

Information indicating a connection group to which the image capturing apparatus 100-*x* belongs Connection destination of the image capturing apparatus 100-*x*

Installation area of the image capturing apparatus 100-*x*

Installation coordinate information of the image capturing apparatus 100-*x*

Imaging target area of the image capturing apparatus 100-*x*

Information indicating center coordinates of the imaging target area of the image capturing apparatus 100-*x*

Information indicating the installation area of the image capturing apparatus 100-*x*

FIG. 9A illustrates an example of data stored in the data storage unit 401. The data shown in FIG. 9A indicates, for example, "image capturing apparatus 100-1" belongs to a connection group "L1", and is interconnect to "image capturing apparatus 100-2", and is installed at coordinates (x1, y1) in an installation area "R1". Note that the installation coordinate information is information indicating XY coordinates assuming that an origin is set at a predetermined position (for example, the center of the stadium 210).

Figures 9B, 9C, 10:
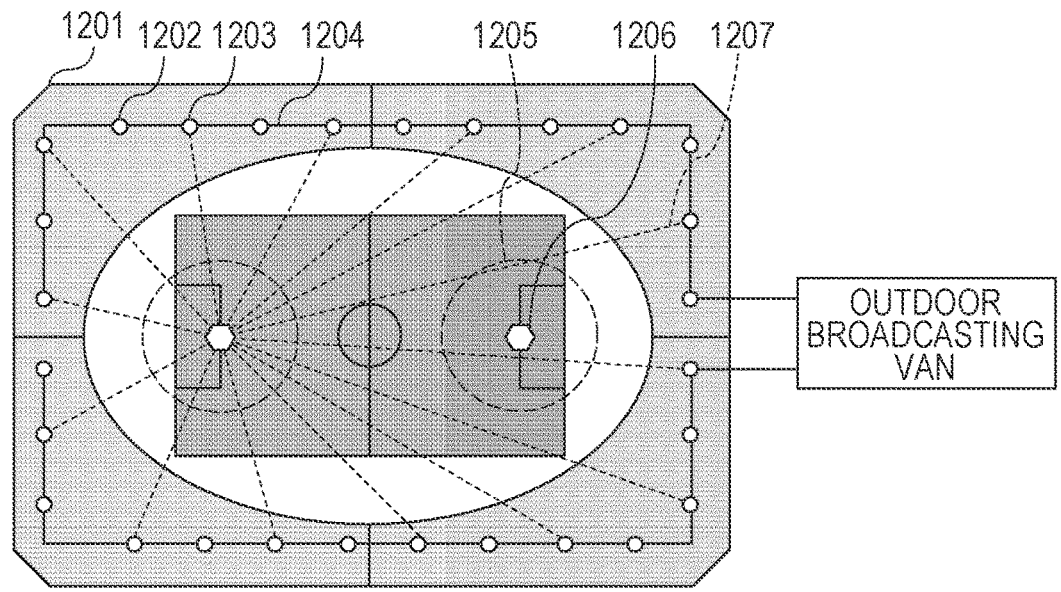
FIG. 9B is a diagram illustrating an example of data stored in a data storage unit of an information display apparatus.
FIG. 9C is a diagram illustrating an example of data stored in a data storage unit of an information display apparatus.
FIG. 10 is a diagram illustrating an example of a display image displayed by an information display apparatus.

FIG. 9B illustrates another example of data stored in the data storage unit 401. Area center coordinates (information indicating the center coordinates of the imaging target area shown in FIG. 9A) are represented by XY coordinates with respect to the origin taken at the predetermined position (for example, the center of the stadium 210). Note that a plurality of image capturing apparatuses 100-*x* corresponding to a common imaging target area are installed such that an optical axis of each image capturing apparatuses 100-*x* is oriented to a position indicated by the area center coordinates. That is, the centers of the images captured by the plurality of image capturing apparatuses 100-*x* corresponding to the same imaging target area are all located at the same position indicated by the area center coordinates. Note that the positions corresponding to the centers of the plurality of images do not necessary need to be completely the same, but it is sufficient if the positions are located within a predetermined range. The effective area information is information indicating an area suitable for generating a virtual viewpoint image in units of radius from the area center coordinate. The area suitable for generating the virtual viewpoint image is, for example, an area that is included in any of imaging areas of the plurality of image capturing apparatuses 100-*x* corresponding to the common imaging target area. Note that the virtual viewpoint image is generated using a plurality of images captured by the plurality of image capturing apparatuses 100-*x* having the common imaging target area.

FIG. 9C illustrates another example of data stored in the data storage unit 401. An installation location (for example, a stadium) where the image capturing system 100 is installed is divided into a plurality of predetermined installation areas, and one or more image capturing apparatuses 100-*x* are installed in each installation area. In the data shown in FIG. 9C, each installation area is represented coordinate information indicating three or more vertices. An area surrounded by these vertices corresponds to the installation area which is a part of the installation location. The data storage unit 401 may obtain these pieces of information described above based on an input given by a user by performing an operation, or may obtain them based on state information output from the image capturing apparatus 100-*x*. Note that the data storage unit 401 does not need to be located within the information display apparatus 400, and an external storage apparatus may be used as the data storage unit 401. Information related to the image capturing apparatuses 100-*x* may be stored in the respective image capturing apparatuses 100-*x*.

The control unit 406 issues a control instruction to units of the information display apparatus 400 according to information corresponding to an input given via the user input unit 407 by the user by performing an operation. For example, when the control unit 406 receives, via the user input unit 407, operation information indicating an instruction to switch the display image type, the control unit 406 converts the operation information to information indicating the display image type and transmits the resultant information to the UI generation unit 403. Specific contents of the display image will be described later. The user input unit 407 accepts a user operation via a controller (not shown) and outputs operation information to the control unit 406. The controller is, for example, at least one of a keyboard, a mouse and a touch panel. The control signal output unit 408 outputs a control signal given from the control unit 406 to the outside. An output destination is, for example, an image capturing apparatus 100-*x*. The control signal is a signal for setting imaging parameters relating to the image capturing apparatus 100-*x* in terms of, for example, zoom, focus, iris, ISO, shutter speed, switching of ND filter, or the like.

In S1101 in FIG. 8, the data input/read unit 402 reads out various pieces of data from the data storage unit 401 and outputs them to the UI generation unit 403. In S1102, based on the data output from the data input/read unit 402 and the state information output from the state obtaining unit 405, the UI generation unit 403 generates a UI image which is information indicating the state of the image processing system or the image capturing apparatus 100-*x*. Examples of the state information and the UI image will be described later. The UI generation unit 403 outputs the generated UI image as a display image to the display unit 404.

The display unit 404 includes a frame buffer and a display panel. The display unit 404 stores (overwrites) the display image given from the UI generation unit 403 in a frame buffer. Then in S1103, the display unit 404 reads out the display image stored in the frame buffer at a predetermined refresh rate and displays it on the display panel. The display panel is, for example, a liquid crystal panel or an organic EL panel. In S1104, the state obtaining unit 405 obtains the state information of each image capturing apparatus 100-*x* and/or the state information of the image generation apparatus 200, and outputs the obtained state information to the UI generation unit 403. In S1105, the UI generation unit 403 determines whether a change has occurred in the state information. In a case where a change has occurred, the process returns to S1102 to update the UI image. On the other hand, in a case where no change in the state information has occurred, the process returns to S1104 to wait until a change in state information occurs.

In the explanation given above with reference to FIG. 8, it is assumed by way of example that the information display apparatus 400 obtains state information related to the image capturing apparatus 100-*x* and displays the obtained state information. However, a source from which state information is obtained is not limited to the image capturing apparatus 100-*x*. For example, as described above with reference to FIG. 1, in a case where a processing apparatus different from the image capturing apparatus 100-*x* transmits a captured image, the information display apparatus 400 may obtain state information from the processing apparatus.

The state information obtained here may be information indicating the state of the image capturing apparatus 100-*x* or information indicating the state of the processing apparatus. Alternatively, for example, the information display apparatus 400 may obtain state information from another apparatus such as the image generation apparatus 200 in the image processing system, and may perform displaying according to the obtained information.

Description of Displaying Stadium Layout

FIG. 10 is a diagram illustrating an example of a display image displayed by the information display apparatus 400 according to the present embodiment. In FIG. 10, information described below is displayed on a map 1201 which is information indicating the stadium 210.

Installation areas (for example, an installation area 1202) where the image capturing apparatuses 100-*x* are installed Image capturing apparatuses 100-*x* and installation positions thereof (for example, an icon 1203)

The connection relationship among a plurality of image capturing apparatuses 100-*x* and the connection state thereof (for example, connection 1204)

An imaging target area (for example, an effective area 1205)

The center point of the imaging target area (for example, a center point 1206)

The correspondence between the image capturing apparatus 100-*x* and the imaging target area (represented by, for example, a dotted line 1207)

Furthermore, as shown in FIG. 10, the information display apparatus 400 displays the connection state between the image capturing apparatus 100-*x* and the image generation apparatus 200 or the information display apparatus 400. Note that in FIG. 10, the information display apparatus 400 and image generation apparatus 200 and the like are installed in an outdoor broadcasting van outside the stadium, and thus these apparatuses and the like are generically denoted, in FIG. 10, as the outdoor broadcasting van.

By performing displaying in the manner shown in FIG. 10, it is possible for the information display apparatus 400 to allow the user to easily grasp the information related to the image capturing system 100 including a plurality of the image capturing apparatuses. The information display apparatus 400 is also capable of displaying which image capturing apparatus is installed at which installation position, and how image capturing apparatuses are connected. Furthermore, for example, the information display apparatus 400 may distinguishably display an icon indicating an image capturing apparatus 100-*x* in a state in which it is capable of capturing an image, and icon indicating an image capturing apparatus 100-*x* in a state in which it is malfunctioning or it is under adjustment and thus it is not capable of capturing an image. By performing displaying in the above-described manner, it becomes possible for the user to easily determine which image capturing apparatus 100-*x* is malfunctioning and where this image capturing apparatus 100-*x* is installed. Furthermore, the information display apparatus 400 also displays information indicating the imaging target area corresponding to each of the plurality of image capturing apparatuses 100-*x*. Therefore, when a malfunction occurs in an image capturing apparatus 100-*x*, the user can grasps a position of a virtual viewpoint where a problem occurs. Furthermore, the information display apparatus 400 also displays information indicating the imaging target area corresponding to each of the plurality of image capturing apparatuses 100-*x*. This makes it possible for the user to determine whether or not the plurality of image capturing apparatuses 100-*x* are installed at positions that are sufficient to allow the image capturing system 100 to generate a virtual viewpoint image.

Figure 11:
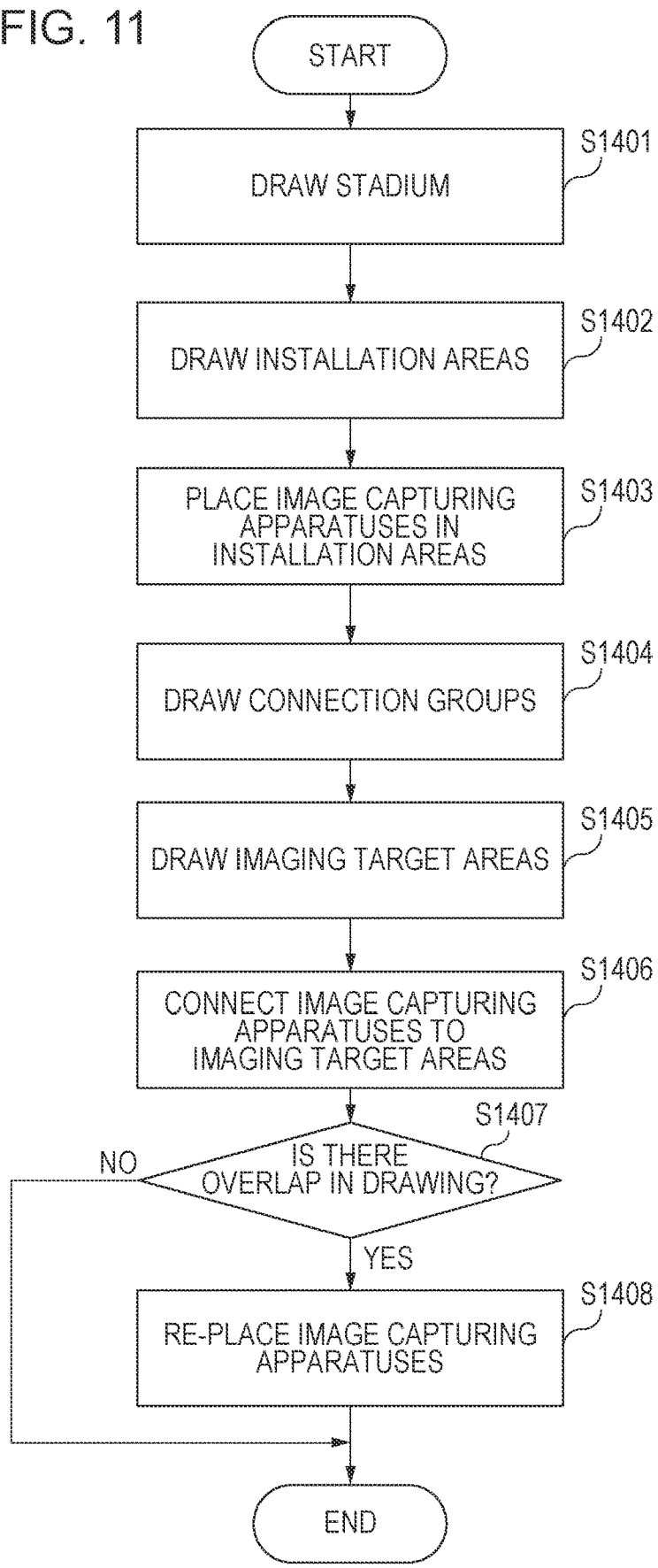
FIG. 11 is a flow chart illustrating an example of process performed by a UI generation unit of an information display apparatus.

FIG. 11 illustrates a processing flow for the UI generation unit 403 of the information display apparatus 400 to generate the display image shown in FIG. 10. FIG. 12 illustrates a specific display image drawn by each process in the processing flow shown in FIG. 11. The process shown in FIG. 11 is executed, for example, when S1102 in FIG. 8 is performed. However, the timing of executing the process shown and the order of executing the processes are not limited to those in this example. The process shown in FIG. 11 and various display processes described later are realized by the CPU 701 shown in FIG. 7 by reading out various programs stored in the ROM 702 and executing control of various units. Note that at least some steps in the flow chart in FIG. 16 may be executed by dedicated hardware. The dedicated hardware is, for example, an ASIC or an FPGA.

Figure 12A:
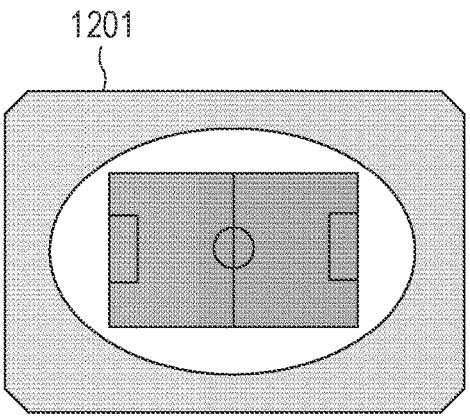
FIG. 12A is a diagram illustrating an example of a display image generated by a UI generation unit of an information display apparatus.
Figure 12B:
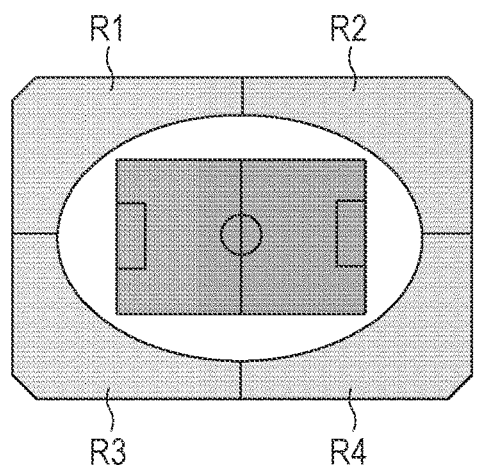
FIG. 12B is a diagram illustrating an example of a display image generated by a UI generation unit of an information display apparatus.
Figure 12C:
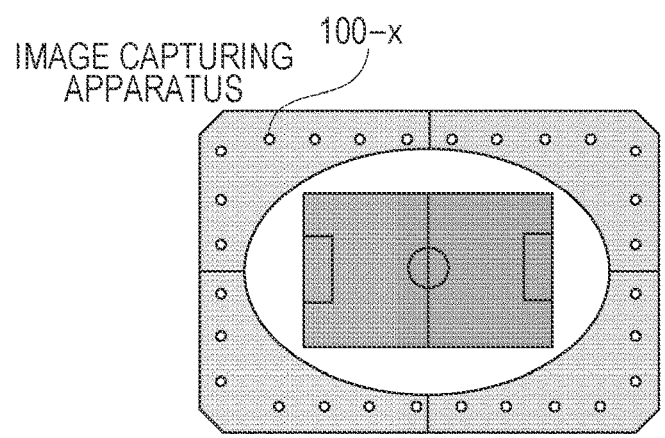
FIG. 12C is a diagram illustrating an example of a display image generated by a UI generation unit of an information display apparatus.

In S1401, the UI generation unit 403 draws layout data of the stadium 210 output from the data input/read unit 402 (FIG. 12A). In S1402, the UI generation unit 403 draws areas in the stadium 210 where image capturing apparatuses 100-*x* are installed (FIG. 12B). In this example, there are four installation areas (R1, R2, R3, and R4). These installation areas are drawn based on the coordinate information shown in FIG. 9C. In S1403, the UI generation unit 403 draws icons of image capturing apparatuses 100-*x* in installation areas in which the respective image capturing apparatuses 100-*x* are installed (FIG. 12C). These icons are drawn based on the information shown in FIG. 9A.

Figure 12D:
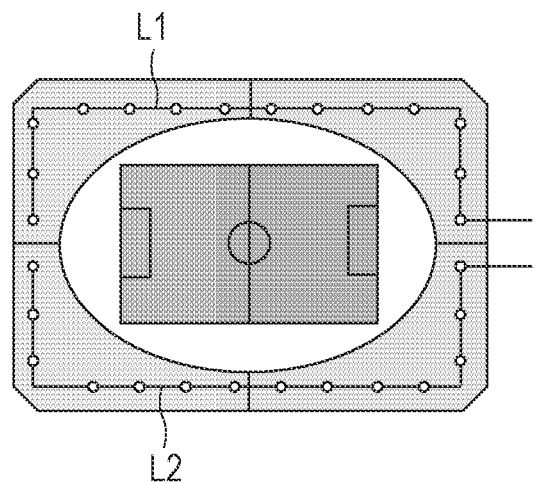
FIG. 12D is a diagram illustrating an example of a display image generated by a UI generation unit of an information display apparatus.
Figure 12E:
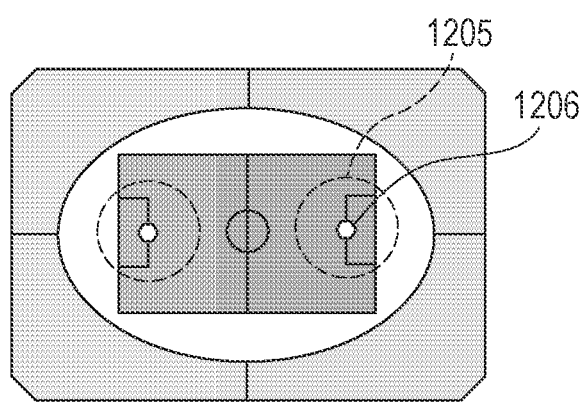
FIG. 12E is a diagram illustrating an example of a display image generated by a UI generation unit of an information display apparatus.
Figure 12F:
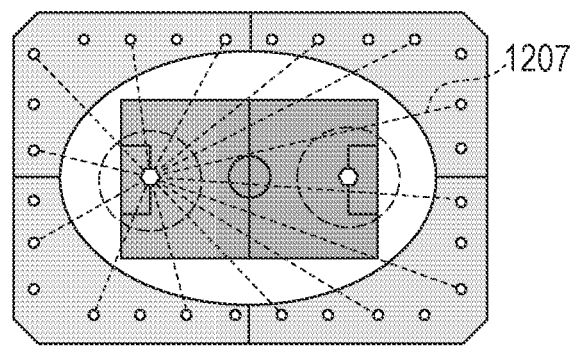
FIG. 12F is a diagram illustrating an example of a display image generated by a UI generation unit of an information display apparatus.

In S1404, the UI generation unit 403 draws a connection relationship between the plurality of image capturing apparatuses 100-*x* (FIG. 12D). In this example, there are two connection groups (L1 and L2). The information indicating these connection relationships is drawn based on the information indicating the connection group and the connection destinations shown in FIG. 9A. In S1405, the UI generation unit 403 draws imaging target areas corresponding to the respective image capturing apparatuses 100-*x* (FIG. 12E). In this example, there are two imaging target areas. Each imaging target area is represented by a center point 1206 of the imaging target area and an effective area 1205 of the imaging target area. The effective area 1205 indicates an area suitable for generating a virtual viewpoint image. These imaging target areas are drawn based on the information shown in FIG. 9B. In S1406, the UI generation unit 403 generates interconnections as information that relates the respective image capturing apparatuses 100-*x* and the imaging target areas (FIG. 12F). Note that as described later, the respective images shown in FIG. 12 are drawn in different layers.

Figure 13A:
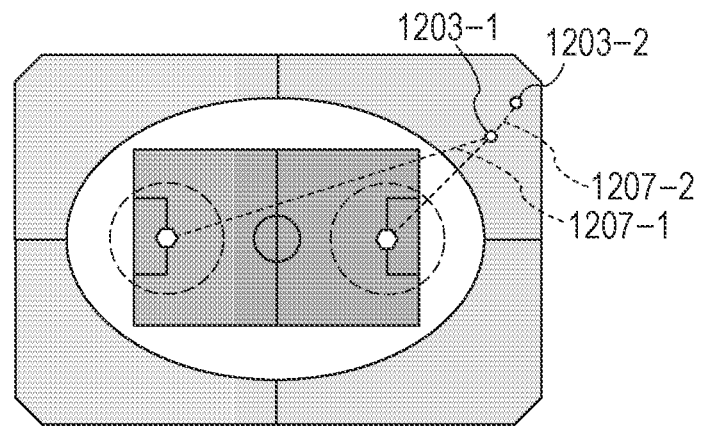
FIG. 13A is a diagram for explaining a display adjustment process by a UI generation unit of an information display apparatus.
Figure 13B:
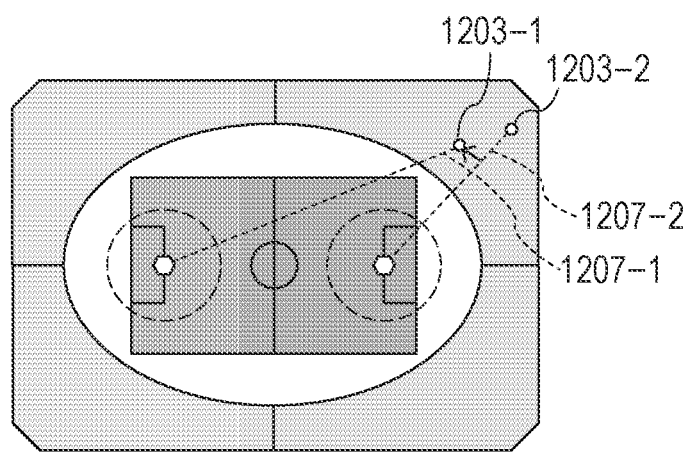
FIG. 13B is a diagram for explaining a display adjustment process by a UI generation unit of an information display apparatus.

When a plurality of image capturing apparatuses 100-*x* are drawn at close locations, there is a possibility that a dotted line 1207-2 connecting an icon 1203-2 of an image capturing apparatus to its imaging target area may intersect with an icon 1203-1 of another image capturing apparatus as shown in FIG. 13A. In S1407, the UI generation unit 403 checks whether or not such an intersection occurs. If an intersection occurs, then in S1408, the UI generation unit 403 changes the drawing position of the icon 1203-1 of the image capturing apparatus to a position where no intersection occurs in the same installation area. That is, the information display apparatus 400 controls displaying such that a line connecting information indicating an image capturing apparatus 100-*x* to a center point of an imaging target area does not intersect with information indicating another line or information indicating another image capturing apparatus 100-*x*. By controlling the displaying in this manner, it becomes possible to display information such that the user can easily recognize the imaging target areas of the respective image capturing apparatuses 100-*x*. However, the processes in S1407 and S1408 are not essential.

Layer Display and Switching of Display in Accordance with User Operation

Note that when the UI generation unit 403 draws a display image by performing the processing flow shown in FIG. 11, the UI generation unit 403 draws the image by dividing the image in a plurality of layers based on the information shown in FIG. 9. Here the layers each are a collection of data stored respectively in storage areas provided in the UI generation unit 403. The UI generation unit 403 superimposes the images in the plurality of layers to generate the display image shown in FIG. 10.

Specific images drawn in the respective drawing layers are as follows.

Stadium 210 (FIG. 12A)
Installation area (FIG. 12B)
Image capturing apparatus 100-*x* (FIG. 12C)
Connection group (FIG. 12D)
Imaging target area (FIG. 12E)
Line connecting image capturing apparatus 100-*x* to imaging target area (FIG. 12F)

Figure 14:
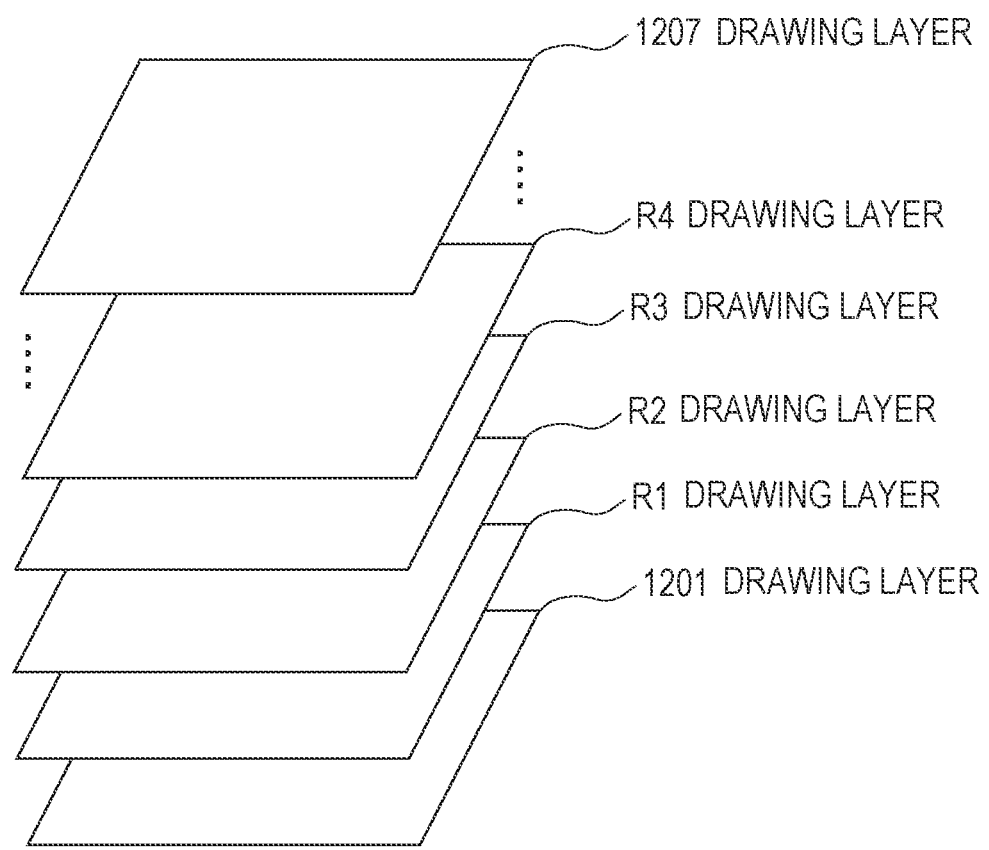
FIG. 14 is a conceptual diagram of a layer drawing process performed by a UI generation unit of an information display apparatus.

As described above, in the example shown in FIG. 10 or FIG. 12, there are four installation areas denoted by R1, R2, R3, and R4. Therefore, in S1402, the image is separated and drawn in four layers. Similarly, since there are two connection groups denoted by L1 and L2, in S1403, the image is separated and drawn in two layers. FIG. 14 is a conceptual diagram illustrating a layer drawing process performed by the UI generation unit 403. The map 1201 shown in FIG. 12A is drawn in a lowest layer, and images in the respective installation areas are drawn in higher layers and overlaid one on another. An image representing connection lines between the image capturing apparatuses 100-*x* and the imaging target areas are drawn in a highest layer and are overlaid on top. Note that the order of overlaying the layers may be changed properly. Note that it is not always necessary to overlap a plurality of layers. For example, a display image such as that shown in FIG. 10 may be generated by overwriting contents shown in FIGS. 12B to 12F to the image shown in FIG. 12A. However, drawing images in separate layers makes it possible to achieve an advantage that it becomes possible to easily switch a display image, as described in further detail below.

Figure 15:
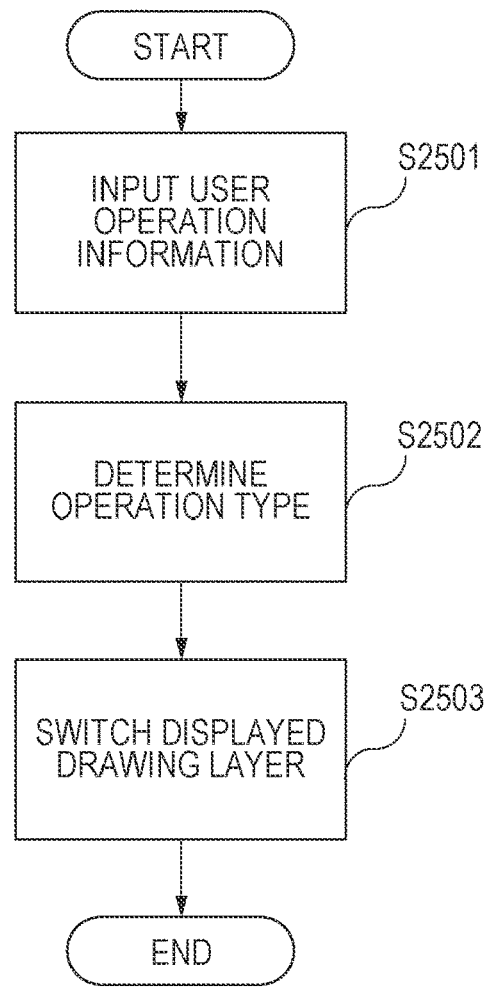
FIG. 15 is a flow chart illustrating an example of a display switching process performed by a UI generation unit of an information display apparatus.

FIG. 15 illustrates a processing flow of switching the display image drawn in FIG. 11 according to operation information input via the user input unit 407. The process in FIG. 15 is executed, for example, in S1102 in FIG. 8. When operation information is input in S2501 via a controller such as a keyboard, the user input unit 407 outputs the operation information to the control unit 406. If the control unit 406 receives the operation information, then, in S2502, the control unit 406 determines a content to be displayed or a content not to be displayed based on the operation information, and outputs a display switching instruction indicating the determined content on the content to the UI generation unit 403. The control unit 406 stores in advance contents to be displayed or not to be displayed for each piece of operation information. For example, when a key "A" is pressed on the keyboard, operation information has a content indicating that cameras belonging to a connection group L1 are to be displayed. In S2503, the UI generation unit 403 adds or deletes a drawing layer to be displayed according to an input display switching instruction, and then outputs an image to be displayed in a layer to the display unit 404.

Figure 16:
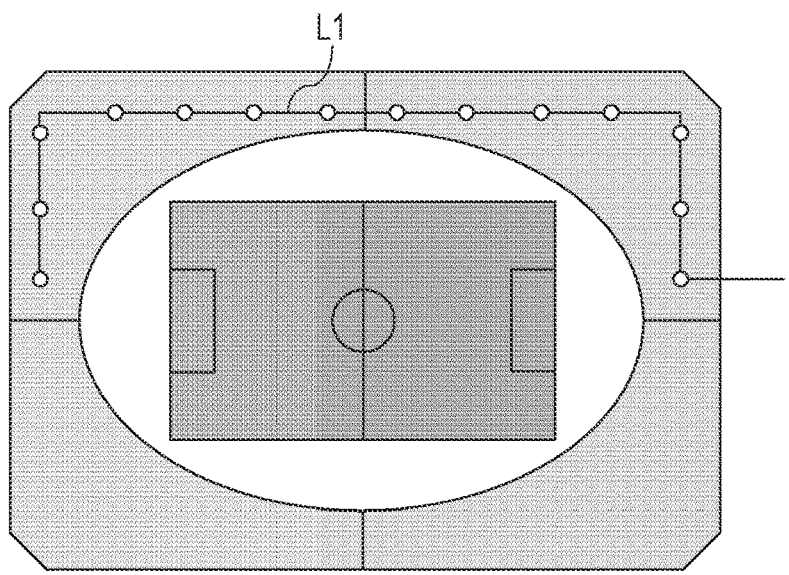
FIG. 16 is a diagram illustrating an example of a display image which is one of display images switched by a UI generation unit of an information display apparatus.

FIG. 16 illustrates an example of a UI image generated by the process shown in FIG. 15. More specifically, FIG. 15 shows a result obtained when display switching is performed so as to display only information regarding image capturing apparatuses 100-*x* belonging to the connection group L1 among the plurality of image capturing apparatuses 100-*x* in the image processing system. There is no limitation to this, and, for example, by performing the process shown in FIG. 15, the information display apparatus 400 may display only information indicating image capturing apparatuses 100-*x* installed in the installation area RE In still another example, as a result of the process shown in FIG. 15, the information display apparatus 400 can display information indicating only image capturing apparatuses 100-*x* specified arbitrarily. In still another example, as a result of the process shown in FIG. 15, the information display apparatus 400 can display information indicating only image capturing apparatuses 100-*x* corresponding to the same imaging target area.

Although in the example described above, the user selects a layer to be displayed, the manner of the selection is not limited to this example. The layer to be displayed by the information display apparatus 400 may be automatically selected. For example, when the information display apparatus 400 receives information indicating that at least one apparatus in the image processing system is in an error state the information display apparatus 400 may automatically select a layer suitable for displaying the status of the apparatus in the error state and may display the selected layer. In addition to displaying the image in this layer, a warning may displayed in a pop-up manner. This makes it possible for the user to recognize that defects such as deterioration in the quality of the virtual viewpoint image may occur, and to take countermeasures.

As described above, the information display apparatus 400 displays the status of the image capturing system 100 by appropriately combining or deleting layers. Thus, even in a case where the image capturing system 100 includes many image capturing apparatuses 100-*x*, the information display apparatus 400 can display only the status of a desired group of image capturing apparatuses, which allows it to provide improved visibility.

Description of Displaying State of Image Capturing Apparatus 100-X

Figure 17A:
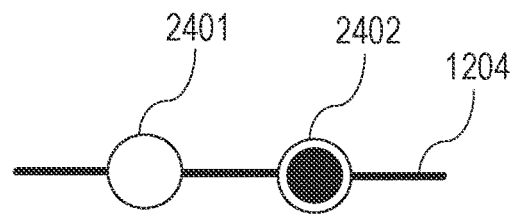
FIG. 17A is a diagram illustrating an example of information indicating a state of an image capturing apparatus on a display image.

FIG. 17 is a diagram showing an example in which image of an icon of an image capturing apparatus 100-*x* displayed on the display image shown in FIG. 10 is changed depending on the status of the image capturing apparatus 100-*x*. When the state obtaining unit 405 of the information display apparatus 400 obtains state information related to the image capturing apparatus 100-*x* from the state information storage unit 104 of the image capturing apparatus 100-*x*, the state obtaining unit 405 outputs the obtained state information to the UI generation unit 403. Based on the received state information, the UI generation unit 403 updates the image of the icon of the image capturing apparatus 100-*x* on the display image shown in FIG. 10. Note that the FIG. 17 shows only part of the image capturing apparatuses 100-*x* included in a certain connection group. For example, the states of the image capturing apparatus 100-*x* that may be displayed includes the following:

State in which an image capturing apparatus 100-*x* is communicably connected with the information display apparatus 400 or another image capturing apparatus 100-*x* (an icon 2401 in FIG. 17A)

State in which an image capturing apparatus 100-*x* is not communicably connected with the information display apparatus 400 or another image capturing apparatus 100-*x* (an icon 2402 in FIG. 17A)

In addition to the states shown in FIG. 17A, the information display apparatus 400 also displays the state of the image capturing apparatus 100-*x* itself as follows.

Figure 17B:
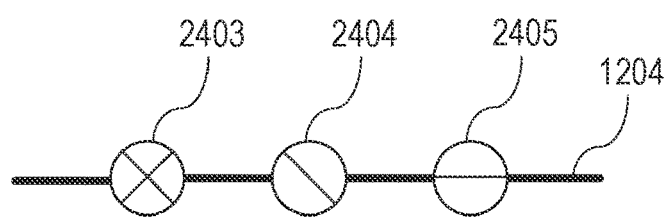
FIG. 17B is a diagram illustrating an example of information indicating a state of an image capturing apparatus on a display image.

The image capturing apparatus 100-*x* is in an error state (an icon 2403 in FIG. 17B)

The image capturing apparatus 100-*x* is in a warning state (an icon 2404 in FIG. 17B)

The image capturing apparatus 100-*x* is in a bypassed state (an icon 2405 in FIG. 17B)

The error state is a state in which a malfunction has occurred in the image capturing apparatus 100-*x* and the image capturing apparatus 100-*x* is not capable of performing a normal image capturing operation or is not capable of normally outputting or transmitting an image. More specifically, malfunctions that may cause it impossible to perform a normal image capturing operation may occur when the temperature of the image capturing apparatus 100-*x* goes out of an allowable range in which the normal operation is allowed, or when distortion or contamination occurs in a lens used for imaging. Specific examples of malfunctions that cause it impossible to normally output or transmit an image include a malfunction in the communication I/F 707 of the image capturing apparatus 100-*x*, a disconnection of a transmission cable connected to the communication I/F 707, a disconnection between the transmission cable and the communication I/F 707, etc.

The warning state is a state in which although the image capturing apparatus 100-*x* is operating normally, there is a high probability that a malfunction occurs in the generation of the virtual viewpoint image. The warning state may occur, for example, when the temperature of the image capturing apparatus 100-*x* is higher than a predetermined desirable value, or when the magnitude of the synchronization deviation between the image capturing apparatus 100-*x* and a synchronization apparatus (not shown) is out of a predetermined range.

In the present embodiment, states, including the error state and the warning state, in which an apparatus is not in a normal state, are generically denoted as an abnormal state. In the present embodiment, an apparatus is regarded as being in the abnormal state when the apparatus is, for example, in one of the following states: the apparatus is in a state in which it is impossible to perform a predetermined operation; the parameter of the apparatus relating to the state of the apparatus is out of a predetermined range; and the apparatus is not synchronized with other apparatuses. The apparatus may also be regarded as in the abnormal state when a parameter related to the state of the apparatus is different from those of a plurality of other apparatuses (for example, other image capturing apparatuses 100-*x* in the image capturing system 100).

The bypassed state is a state in which an image obtained by an image capturing apparatus 100-*x* is not outputted, and this image capturing apparatus 100-*x* executes only transmission of data obtained from another apparatus.

The information display apparatus 400 also displays the configuration of the image capturing apparatus 100-*x* as follows.

Figure 17C:
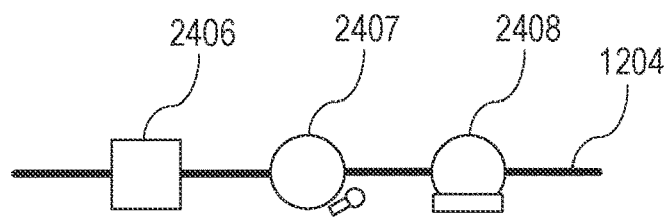
FIG. 17C is a diagram illustrating an example of information indicating a state of an image capturing apparatus on a display image.

A zoom lens is attached to the image capturing apparatus 100-*x* (an icon 2406 in FIG. 17C)

A sound collection microphone is attached to the image capturing apparatus 100-*x* (an icon 2407 in FIG. 17C)

A camera platform is attached to the image capturing apparatus 100-*x* (icon 2408 in FIG. 17C)

Furthermore, the information display apparatus 400 also displays the output state of the image capturing apparatus 100-*x* as follows.

Figure 17D:
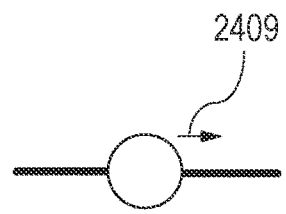
FIG. 17D is a diagram illustrating an example of information indicating a state of an image capturing apparatus on a display image.

Foreground image data and background image data captured by the image capturing apparatuses 100-*x* are being output to the image generation apparatus 200 and the information display apparatus 400 at a predetermined frame rate via the distribution apparatus 500 (an icon 2409 in FIG. 17D).

The information display apparatus 400 may display information indicating the output destination of the data output from the image capturing apparatus 100-*x* and the frame rate of the output. Furthermore, the information display apparatus 400 may display information (for example, the data size, the image size, the file format, etc.) related to an image output from the image capturing apparatus 100-*x*.

The information display apparatus 400 also displays the mechanical operating state of the image capturing apparatus 100-*x* as follows. The mechanical operations include, for example, an operation of a zoom lens, an operation of a camera platform, an operation of autofocus, and the like.

Figure 17E:
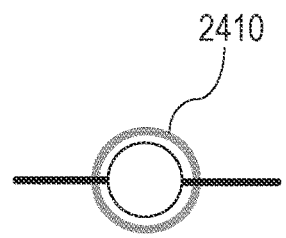
FIG. 17E is a diagram illustrating an example of information indicating a state of an image capturing apparatus on a display image.

The zoom lens of the image capturing apparatus 100-*x* is operating (an icon 2410 in FIG. 17E).

Although in the examples described above, the state of the image capturing apparatus 100-*x* has been described, the contents to be displayed are not limited thereto. For example, the synchronization state between each image capturing apparatus 100-*x* and the synchronization apparatus may be displayed.

Furthermore, in addition to such status information, a content of setting of each image capturing apparatus, the completion status of the process reflecting the settings, and the like may be displayed.

Although in the example described above, the state of the image capturing apparatus 100-*x* is indicated by displaying the images shown in FIGS. 17A to 17E, the state of the image capturing apparatus 100-*x* may be indicated by displaying a message. Alternatively, the user may be allowed to select an item to be displayed from information indicating states of the image capturing apparatus 100-*x*. In addition, the user may select whether or not it is allowed to display the state of the image capturing apparatus 100-*x*. Furthermore, the information display apparatus 400 may select an image capturing apparatus 100-*x* corresponding to the position of the cursor operated by the user, and may display information indicating the state of this image capturing apparatus 100-*x*. Alternatively, the information display apparatus 400 may display information indicating the state of an image capturing apparatus 100-*x* specified by the user by a touch operation on the touch panel.

As for information indicating the state of the image capturing apparatus 100-*x*, the information display apparatus 400 may display an imaging parameter set in the image capturing apparatus 100-*x*. In a case where an image capturing apparatus 100-*x* is in a state where a problem may occur in the generation of a virtual viewpoint image, and more specifically, for example, when the state of the image capturing apparatus 100-*x* is in an error state, a warning state, or a state in which communication is not possible, the information display apparatus 400 may display a warning using a color or a message. Not only in the case of the image capturing apparatus 100-x, but in a case where the state of the image processing system is in a state where a problem may occur in generating the virtual viewpoint image, the information display apparatus 400 may display a message such as "There is a possibility that a problem may occur in the generation of the virtual viewpoint image. Please repair or check the settings immediately" thereby issuing a warning and prompting the user to resolve the problem.

According to the present embodiment, by displaying the information indicating the state of the image capturing apparatus 100-x in the manner as shown in FIG. 17, the information display apparatus 400 can provide information to the user to allow the user to recognize status of the image capturing system 100 including the plurality of image capturing apparatuses 100-x. Furthermore, the information display apparatus 400 can allow the user to easily understand which image capturing apparatus 100-x is in what state. Furthermore, by performing displaying such that an image capturing apparatus 100-x having an error is identifiable, the information display apparatus 400 is capable of allowing the user to know which image capturing apparatus 100-x has the error.

Description of Group Summary List Display

FIG. 18 illustrates an example of a list of states of the image capturing apparatuses 100-x displayed together with the display image shown in FIG. 10. FIG. 18A illustrates an example in which the states of image capturing apparatuses 100-x are displayed in a list for each imaging target area group. In the present embodiment, the term "imaging target area group" is used to refer an apparatus group including a plurality of image capturing apparatuses 100-x having the same specified imaging target area in the imaging range. However, an apparatus group including a plurality of processing apparatuses that obtain and transmit images based on imaging by the plurality of image capturing apparatuses 100-x may be treated as an imaging target area group. Note that there may be an imaging target area group including a single device. The list display shown in FIG. 18A is referred to as a group state list display.

For example, a content described in a group state list display of an imaging target area group may be as follows:
  Whether or not all image capturing apparatuses 100-x included in an imaging target area group are all in a connected state
  Whether or not there is an image capturing apparatus 100-x in an error state in an imaging target area group
  Whether or not there is an image capturing apparatus 100-x in a warning state in an imaging target area group
  Whether or not there is an image capturing apparatus 100-x in a bypassed state in an imaging target area group
  Configuration of image capturing apparatuses 100-x included in an imaging target area group (in terms of whether a camera platform is attached or not, a microphone is attached or not)
  Output states of image capturing apparatuses 100-x included in an imaging target area group (in terms of whether image capturing apparatuses are in outputting state or not)
  Mechanical operation status of image capturing apparatuses 100-x included in an imaging target area group (in terms of whether image capturing apparatuses are operating or not)

In addition to the above, the group state list display shown in FIG. 18A also displays the following status.

ISO value of image capturing apparatuses 100-x included in an imaging target area group
  Iris value of image capturing apparatuses 100-x included in an imaging target area group
  Shutter speed value of image capturing apparatuses 100-x included in an imaging target area group
  ND filter value of image capturing apparatuses 100-x included in an imaging target area group In FIG. 18A, in a case where the state of one or more image capturing apparatuses 100-x is different from the state of other image capturing apparatuses 100-x included in the same imaging target area group, this state is displayed using an asterisk. However, a warning may be displaying using another information. For example, a warning may be issued by displaying a message such as "There is a difference in the exposure condition between image capturing apparatuses in an imaging target area group and thus a problem may occur in the virtual viewpoint image." Alternatively, the warning may be issued by displaying a color or an image indicating the warning. Since the information display apparatus 400 displays the status of the imaging target area group in the form of the list as described above, This makes it possible for the user to easily recognize the possibility that the virtual viewpoint image may be unnatural due to the difference in state among the plurality of image capturing apparatuses 100-x and to take measures against the possibility.

Description of Detail Group List Display

FIG. 18B illustrates an example in which the states of respective image capturing apparatuses 100-x belonging to an imaging target area group V2 shown in FIG. 18A are displayed in a list. Hereinafter, this displaying the states in the list is referred to as individual state list display. Unlike the group state list display, the individual state list display allows it to recognize the state of each of image capturing apparatuses 100-x belonging to a group. Therefore, for example, when the user finds a warning display in the group state list display, the user may switch the display to the individual state list display to identify a specific image capturing apparatus 100-x which is in an error state. According to the example of FIG. 18B, it can be understood that a warning display (asterisk) appears in the error state in the group state list display shown in FIG. 18A because the temperature error has occurred in the imaging device 100-2.

In a specific example of a method of switching the displaying of the list display, the UI generation unit 403 switches the display between the group state list display and the individual state list display based on operation information in terms of the display switching operation input via the user input unit 407. For example, when the displaying is currently in the group state list display, if a tap operation or an instruction operation by the user with respect to the position corresponding to identification information of "V2" of the imaging target area group is received, the information display apparatus 400 switches the display to the individual state list display. When a group state list is being displayed, if a top operation or a selecting operation is performed at a position corresponding to a message icon indicating "Back" (not shown), then the information display apparatus 400 switches the display to the group state list display.

The content displayed in the list shown in FIG. 18 is not limited to the above. For example, the synchronization state between each image capturing apparatus 100-x and the synchronization apparatus may be displayed. Furthermore, in addition to such state information, the content of the setting set for each image capturing apparatus, the completion state of the process for reflecting the settings, and the like may be displayed. Furthermore, the group is not limited to the imaging target area group, and may be displayed in a list for each connection group, or an installation area may be displayed in a list as one group.

Description of Operation UI

Figure 19A:
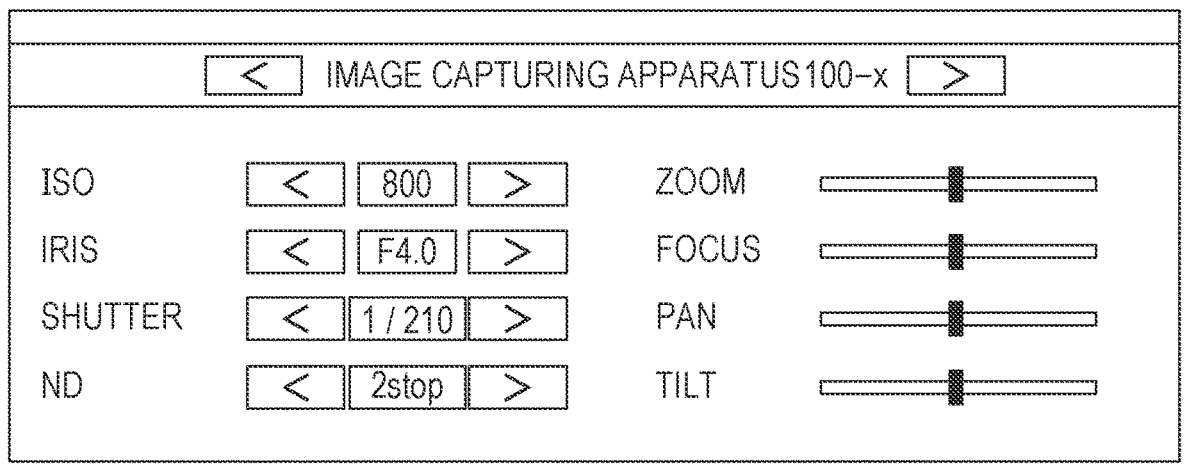
FIG. 19A is a diagram illustrating an example of an operation UI for operating an image capturing apparatus.

FIG. 19 is a diagram illustrating an example of an operation UI for operating the image capturing apparatus 100-x displayed by the information display apparatus 400 according to the present embodiment. FIG. 19A illustrates a UI, displayed on the information display apparatus 400, for receiving a user instruction for operating the individual image capturing apparatus 100-x. In response to an operation by the user, the information display apparatus 400 transmits, to the image capturing apparatus 100-x, setting information regarding the imaging parameter of the image capturing apparatus 100-x and information for operating the image capturing apparatus 100-x. On the operation UI, for example, images for setting the zoom, focus, ISO, iris, shutter speed, and ND filter of the image capturing apparatus 100-x are displayed. When the image capturing apparatus 100-x has a camera platform, an image for setting PAN and TILT is also displayed.

Figure 19B:
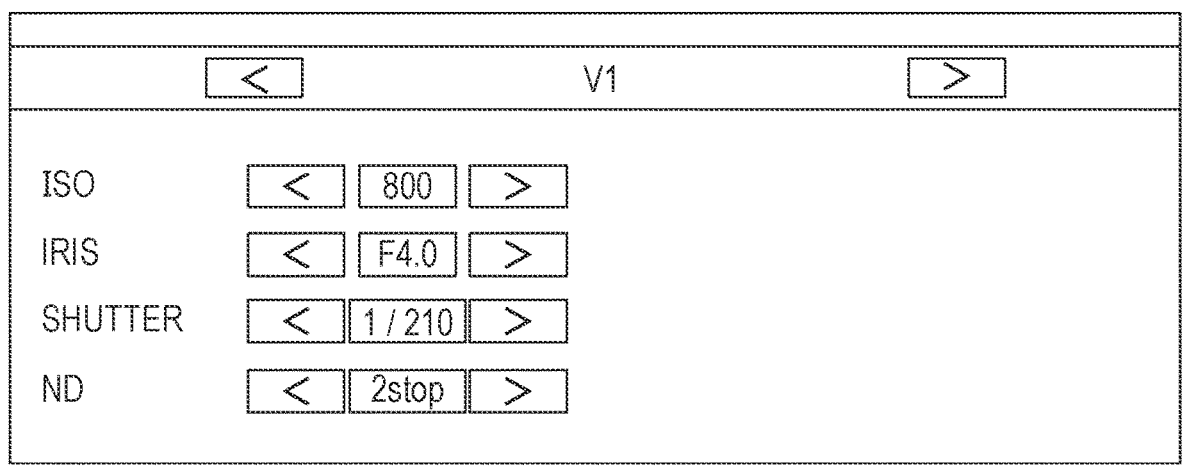
FIG. 19B is a diagram illustrating an example of an operation UI for operating an image capturing apparatus.

FIG. 19B illustrates a UI, displayed by the information display apparatus 400, for operating the image capturing apparatuses 100-x belonging to an imaging target area group at a time. On the operation UI, for example, images for setting the zoom, focus, ISO, iris, shutter speed, and ND filter of the image capturing apparatus 100-x is displayed. The information display apparatus 400 performs displaying in the above-described manner, whereby the information display apparatus 400 receives an instruction for a plurality of image capturing apparatuses 100-x belonging to the imaging target area group from the user, and performs settings and operations on the plurality of image capturing apparatus 100-x according to the instructions. Therefore, it is possible to reduce the operation performed by the user as compared with the case where the setting and the operation instruction are received for each image capturing apparatus 100-x. For example, when a situation such as the intensity of external light changes during imaging, it is allowed to collectively change the exposure condition of for the imaging target area group capturing the same imaging target area.

Displaying Image for Notifying Abnormal State

A displaying process which is performed by the information display apparatus 400 when an image capturing apparatus 100-x is in an abnormal state is described below. As described above with reference to FIG. 17, the information display apparatus 400 can display the state of the individual image capturing apparatus 100-x on the display image such as that shown in FIG. 10. In addition, the information display apparatus 400 according to the present embodiment can display a state on the display image for each connection group or for each imaging target area group.

When an abnormality occurs in one of the image capturing apparatus 100-x in the image processing system, the influence thereof on the generation of the virtual viewpoint image may be different depending on the position relationship, the connection relationship, and the like between the image capturing apparatus 100-x in the abnormal state and another image capturing apparatus 100-x. For example, when a malfunction occurs in one of image capturing apparatuses 100-x included in a single imaging target area group, if the number of image capturing apparatuses 100-x in a normal state included in the group is large, the degree of the reduction in the image quality of the virtual viewpoint image is small, and thus the generation of the virtual viewpoint image may be continued. On the other hand, if the number of image capturing apparatuses 100-x in the normal state included in the group is small, the degree of the reduction in the image quality of the virtual viewpoint image may be large, and thus continuing to generate the virtual viewpoint image may not be possible. Furthermore, for example, when a malfunction occurs in one of image capturing apparatuses 100-x included in a single connection group, there is a possibility that adjustment and resetting must be performed for all of the plurality of image capturing apparatuses 100-x included in the group. In this case, the time and effort required for the recovering process differ depending on the number of image capturing apparatuses 100-x included in the group.

As described above, in the present embodiment, when the influence of the abnormality differs depending on the configuration of the group to which the image capturing apparatus 100-x in which the abnormality has occurred belongs, the information display apparatus 400 displays information indicating the group in which the abnormality has occurred thereby notifying the user of the influence of the abnormality. If the user can easily know the influence of the abnormality, appropriate measures such as repair or adjustment of the image capturing apparatus 100-x can be quickly performed, and problems such as deterioration of the quality of the virtual viewpoint image can be suppressed.

Figure 20:
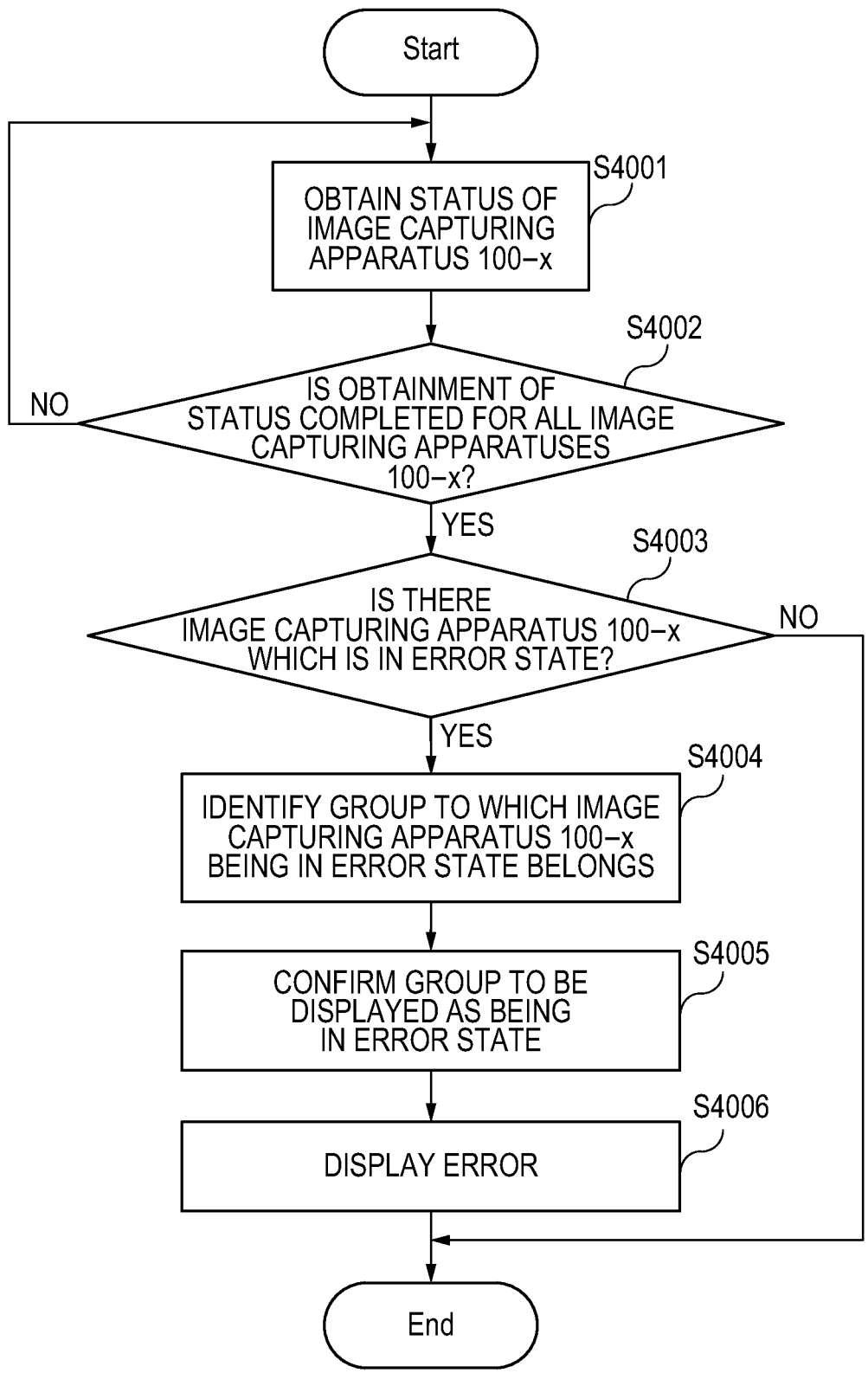
FIG. 20 is a flow chart illustrating an example of a display process performed by an information display apparatus.

FIG. 20 shows a flow of a display control process performed by the information display apparatus 400. The processing shown in FIG. 20 is executed after the display image such as that shown in FIG. 10 is displayed. However, the start timing of the process shown in FIG. 20 is not limited to that described above. The process shown in FIG. 20 is realized by the CPU 701 shown in FIG. 5 by reading out various programs stored in the ROM 702 and executing control of various units. Note that at least some steps in the process shown in the flow chart of FIG. 20 may be executed by dedicated hardware. The dedicated hardware is, for example, an ASIC or an FPGA.

In S4001, the state obtaining unit 405 obtains the state information of each image capturing apparatus 100-x from the state information storage unit 104 of the image capturing apparatus 100-x. In S4002, the state obtaining unit 405 determines whether the states of all image capturing apparatuses 100-x in the image processing system have been obtained. In a case where there is an image capturing apparatus 100-x for which the status information has not been obtained, the process returns to S4001 to obtain the state information that has not yet been obtained. On the other hand, in a case where the states have been obtained for the image capturing apparatuses 100-x, the process proceeds to S4003. Note that the state obtaining unit 405 may obtain only the state information of some of the image capturing apparatuses 100-x in the image processing system, and then may proceed to S4003.

In S4003, the UI generation unit 403 determines, based on the state information obtained in S4001, whether there is an image capturing apparatus 100-x in an error state among the plurality of image capturing apparatuses 100-x in the image processing system. In a case where there is no image capturing apparatus 100-x in the error state, the information display apparatus 400 ends the process shown in FIG. 20. Note that when there is no image capturing apparatus 100-x in the error state, the process may return to S4001. On the other hand, in a case where there is an image capturing apparatus 100-*x* in an error state, the image capturing apparatus 100-*x* in the error state is identified based on the obtained state information, and then the process proceeds to S4004.

In S4004, the UI generation unit 403 identifies a group to which the image capturing apparatus 100-*x* in the error state belongs. Examples of groups to be identified here include a connection group connected to each other, an imaging target area group corresponding to the same imaging target area, and an installation area group installed in the same installation area. However, the group identified by the UI generation unit 403 may be one or a plurality of apparatuses having a predetermined relationship with the image capturing apparatus 100-*x* in the error state, and is not limited to the examples described above. The identifying of the group will be described below with reference to the example shown in FIG. 9. For example, when state information indicating that an image capturing apparatus 100-5 is in an error state is obtained, the UI generation unit 403 refers to data stored in the data storage unit 401 and confirms the group to which the image capturing apparatus 100-5 belongs. As a result, it is determined that the image capturing apparatus 100-5 belong to the following groups:

Connection group: L1
Installation area group: R2
Imaging target area group: V1
Imaging target area group: V1 In this way, it is possible to identify the group influenced by the error of the image capturing apparatus 100-5.

In S4005, the UI generation unit 403 obtains, from the data storage unit 401, information for determining which type of group for which the error is to be displayed. FIG. 21 illustrates an example of information stored in the data storage unit 401. The data storage unit 401 stores information indicating whether an error display is to be performed or not (ON or OFF) for each type of group. In the example shown in FIG. 21, it is indicated that the error display is to be ON only for the connection group, and thus, on the display image drawn by the UI generation unit 403, the connection group L1 is displayed as the group in which the error has occurred. On the other hand, it is indicated that the error display is OFF for the installation area group and the imaging target area group, and thus these groups are not displayed as the group in which the error has occurred.

The ON/OFF setting of the error display for each group type such as that shown in FIG. 21 may be made in advance by the user by operating the information display apparatus 400, or may be automatically made depending on the configuration and the operation state of the image processing system. For example, for the state in which the image processing system is not generating the virtual viewpoint image, the error display is set to ON for the installation area group. Thus, a monitoring operator who monitors the image processing system can quickly recognize in which installation area abnormality occurs, and can immediately contact, for example, a manage who manages the apparatuses in the installation area. That is, the display is optimal for repairing the apparatus in which the error has occurred. Here, the information display apparatus 400 may display information for the monitoring person to contact the manager who manages apparatuses in the installation area. For example, the information display apparatus 400 may pre-register contact information of the manage (such as a mobile phone number, identification information of a wireless communication device, or the like) for each area, and may display the information for contacting the manager of the area corresponding to the apparatus in which the error has occurred. When the monitoring operator performs a selection operation on the information of the manager displayed on the display unit 404, a communication connection may be automatically made such that a conversation with the manager is allowed.

For the state in which the image processing system is generating the virtual viewpoint image, the error display for the imaging target area group is set to ON. This makes it possible for the operator who operates the virtual viewpoint to be notified in advance of the imaging target area where a reduction in image quality of the generated virtual viewpoint image is highly likely to occur. In this case, for example, the virtual camera may be prevented from being pointed at that area. That is, a display optimal to guarantee the quality of the virtual viewpoint image is given.

In S4006, the UI generation unit 403 generates an image to be displayed as the error display for the group for which it has been determined to display the error display (the group for which the error display is set to ON). That is, the information display apparatus 400 performs control such that the display unit 404 displays information indicating a group to which the image capturing apparatus 100-*x* in the error state belongs. The information indicating a group includes, for example, at least one of the following: information indicating a position of an apparatus group included in the group; information indicating a connection relationship of the apparatus group; and information indicating an imaging target area corresponding to the group.

Figure 22C:
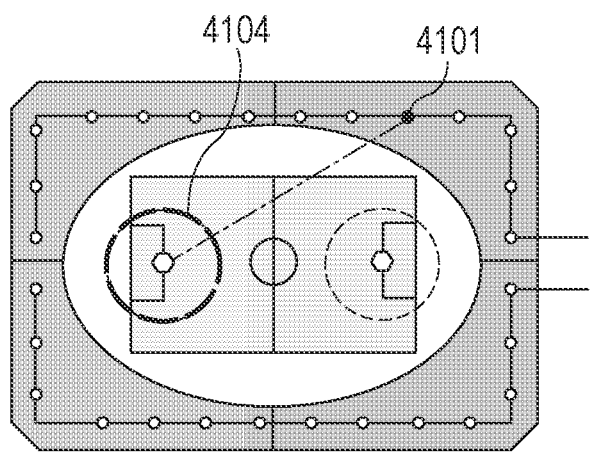
FIG. 22C is a diagram illustrating an example of a display image displayed by an information display apparatus.

FIG. 22 illustrates an example of an error display for each group type. Here, it is assumed that an image capturing apparatus 100-5 represented by an icon 4101 is in an error state. FIG. 22A illustrates a display example for a case where the error display of the connection group is set to ON. The image capturing apparatus 100-5 belongs to the connection group L1, and an error of the connection group L1 is displayed by highlighting a line 4102 corresponding to the connection group L1. FIG. 22B illustrates a display example for a case where the error display for the installation area group is set to ON. The image capturing apparatus 100-5 belongs to the installation area group R2, and thus the error display for the installation area group R2 is displayed by highlighting the area 4103 corresponding to the installation area group R2. FIG. 22C illustrates a display example for a case where the error display for the imaging target area group is set to ON. The image capturing apparatus 100-5 belongs to the imaging target area group V1, and thus the error display for the imaging target area group V1 is displayed by highlighting the imaging target area 4104 corresponding to the imaging target area group V1. Although FIG. 22C illustrates an example in which the imaging target area 4104 and the icon 4101 of the image capturing apparatus 100-5 are highlighted, the icons of the other image capturing apparatuses 100-*x* belonging to the imaging target area group V1 are also highlighted.

As described above, when an image capturing apparatus 100-*x* is in an abnormal state, the information display apparatus 400 displays information indicating a group to which the image capturing apparatus 100-*x* belongs so as to superimpose it on an image indicating an installation location (for example, a stadium) of the image capturing system 100 thereby displaying the error display. Furthermore, the information display apparatus 400 selects information in accordance with the instruction given by the user from among information indicating a connection group corresponding to the image capturing apparatus 100-*x* in the abnormal state, information indicating an installation area, and information indicating an imaging target area, and the information display apparatus 400 performs control to display the selected information on the display unit 404. This allows the user to easily recognize the range influenced by the occurrence of the abnormality, and allows the user to quickly take actions such as repairing the image processing system and perform operations to maintain the quality of the generated virtual viewpoint image.

The error display is not limited to being displayed so as to be superimposed on the map indicating the installation location. The error display may be displayed separately from the map, or may be realized by characters instead of icons or the like. Together with the information indicating the group to which the image capturing apparatus 100-*x* in the abnormal state belongs, at least one of information regarding the state of the group (for example, information indicating the temperature and the connection states of the image capturing apparatus 100-*x* included in the group) and a warning message may be displayed. An example of the warning message is "The number of cameras capable of imaging the imaging target area V1 has decreased and thus it is impossible to continue the generation of the virtual viewpoint image. Perform recovery processing for the camera in which the error occurred." Another example of the warning message is "An error has occurred in the camera in the connection group L1. Restart the cameras belonging to the connection group L1." By additionally displaying such a warning message and information regarding the group status, it becomes possible for the user to easily recognize the details of the abnormality that has occurred. As a result, the user can quickly determine, for example, whether or not the repair should be performed immediately, and it is possible to suppress a problem related to the generation of the virtual viewpoint image.

In the above example, the explanation has been given for the case where displaying is performed to highlight the information regarding the group to which the image capturing apparatus 100-*x* in which the error has occurred belong, but the display method is not limited to this. Information may be displayed in other fashions as long as the group to which the image capturing apparatus 100-*x* in which the error has occurred belongs is distinguishable from the other groups. More specifically, information related to the image capturing apparatus 100-*x* in the error state is displayed distinguishably from corresponding information related to other image capturing apparatus 100-*x* having no error in terms of at least following: information indicating the connection group; information indicating the installation area; and information indicating the imaging target area corresponding to the image capturing apparatus 100-*x*. The information display apparatus 400 may hide information indicating groups other than the group to which the image capturing apparatus 100-*x* in the error state belongs. When information is displayed in such a display manner, the user can easily recognize the effect of the occurrence of the error. In the following description, a detailed description of the same portions as those in the above-described embodiment will be omitted.

Figure 23:
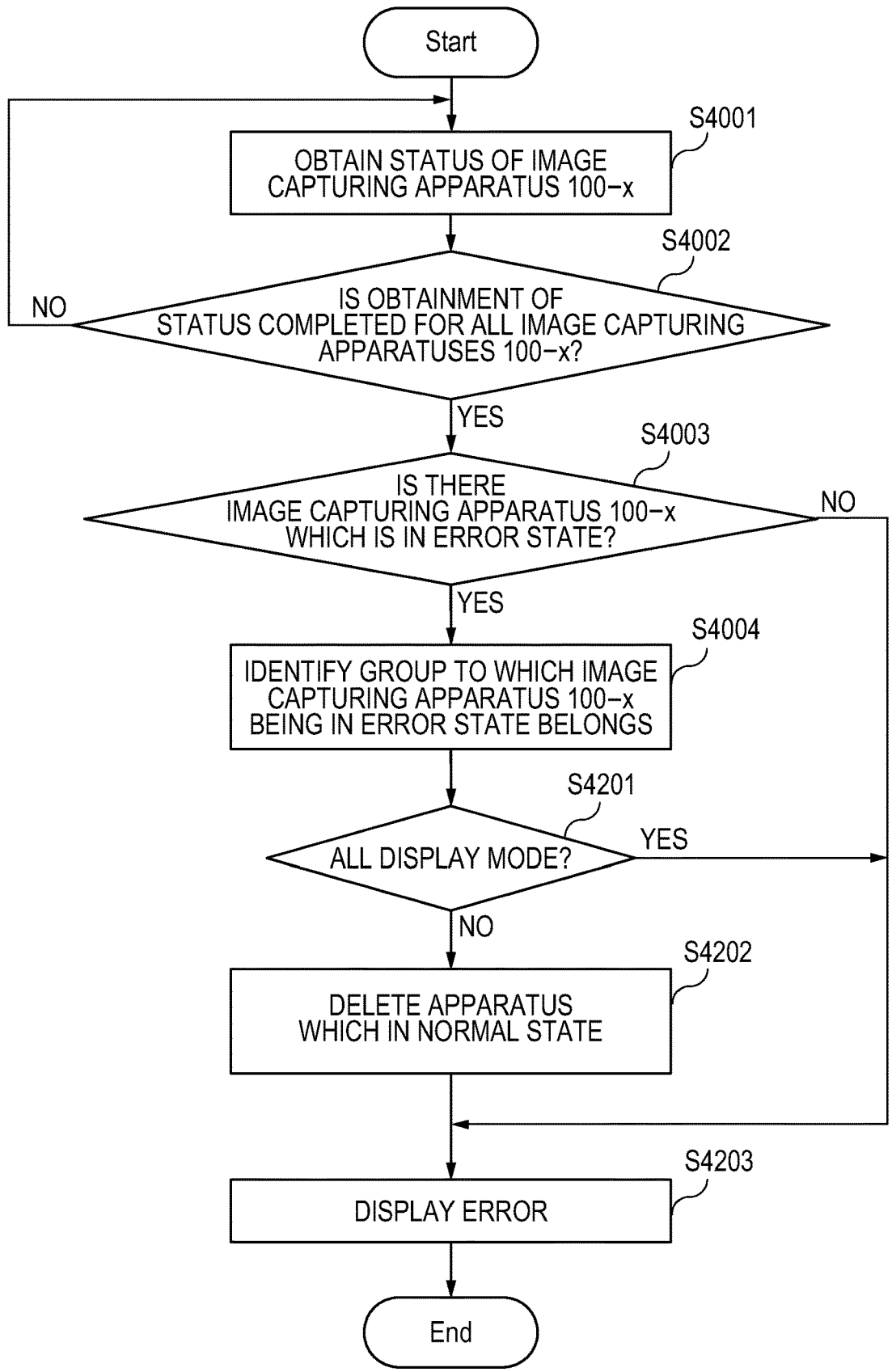
FIG. 23 is a flow chart illustrating an example of a display process performed by an information display apparatus.

FIG. 23 is a flow chart of a display control process performed by the information display apparatus 400. This process is a modification of the process described above with reference to FIG. 20. The process from S4001 to S4004 is the same as that described above with reference to FIG. 20. In S4004, a group to which an image capturing apparatus 100-*x* in which an error has occurred belongs is identified. Thereafter, in S4201, the UI generation unit 403 obtains mode information indicating a set error display mode from the data storage unit 401. FIG. 24 illustrates an example of mode information. Examples of error display modes are as follows:

Image capturing apparatus display mode: displaying an image capturing apparatus in which an error has occurred Connection group display mode: displaying a connection group to which the image capturing apparatus in which the error has occurred belongs.

Imaging target area display mode: displaying an imaging target area corresponding to the image capturing apparatus in which the error has occurred.

All display mode: In addition to displaying information on the image capturing apparatus in which the error has occurred, information regarding image capturing apparatuses in a normal state is also displayed.

The error display mode may be set in advance by the user by operating the information display apparatus 400, or may be automatically set according to the configuration or the operation state of the image processing system. If the error display mode indicated by the mode information obtained in S4201 is the all display mode, then in S4203, the UI generation unit 403 performs an error display for a group to which an image capturing apparatus 100-*x* in an error state belongs, in the same manner as in the display method described above with reference to FIG. 22.

On the other hand, if an error display mode other than the all display mode is indicated in S4201, then in S4202, the UI generation unit 403 deletes part of the display in S4202 according to the set mode. For example, when the error display mode is set to the image capturing apparatus display mode, information regarding image capturing apparatuses 100-*x* in a normal state where no error has occurred is deleted from the display image. When the error display mode is set to the connection group display mode, the information regarding the connection group that does not include the image capturing apparatus 100-*x* in the error state is deleted from the display image. When the error display mode is set to the imaging target area display mode, information regarding imaging target areas different from the imaging target area corresponding to the image capturing apparatus 100-*x* in the error state is deleted from the display image. After the display is deleted according to the set mode, in S4203, the UI generation unit 403 performs an error display based on the information that has not been deleted.

Figure 25C:
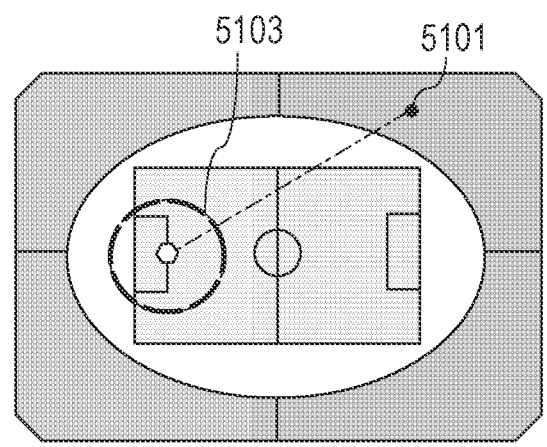
FIG. 25C is a diagram illustrating an example of a display image displayed by an information display apparatus.

FIG. 24 shows an example of a display for each error display mode. Here, it is assumed that the image capturing apparatus 100-5 represented by an icon 5101 is in an error state. FIG. 25A shows a display example for a case where the image capturing apparatus display mode is set. All icons representing image capturing apparatuses 100-*x* other than the image capturing apparatus 100-5 are deleted, and only the icon 5101 is displayed. FIG. 25B shows a display example for a case where the connection group display mode is set. Information indicating image capturing apparatuses 100-*x* that are not included in the connection group L1 to which the image capturing apparatus 100-5 belongs is not displayed (information regarding the connection group L2 displayed in the lower half of FIG. 22B is deleted), and a line 5102 indicating the connection group L1 is displayed. FIG. 25C shows a display example for a case where the imaging target area display mode is set. The image capturing apparatus 100-5 belongs to the imaging target area group V1, and thus information regarding another imaging target area group V2 (the imaging target area displayed in the right half of FIG. 22C) is deleted, and only an area 5103 indicating the imaging target area group V1 is displayed.

As described above, the error display is performed such that information is not displayed other than the information regarding the group to which the image capturing apparatus 100-x in which the error has occurred belongs. That is, only information necessary for the user is displayed, which makes it possible for the user to easily recognize the effect of the error. Conversely to the display method illustrated in the example in FIG. 25, the information display apparatus 400 may hide the information regarding the group including the image capturing apparatus 100-x in the error state display information regarding groups including no image capturing apparatus 100-x in the error state. Displaying information in this manner makes it possible for the user to easily recognize the image capturing apparatuses 100-x and the imaging target areas that are not affected by the error that has occurred. For example, the user is allowed to appropriately determine whether or not to continue generating the virtual viewpoint image.

When the information display apparatus 400 detects an error, the information display apparatus 400 may notify the user of the error by a method other than displaying information on the display unit 404. For example, the information display apparatus 400 may include an audio output unit and may have a function of notifying a user of an error by outputting an error notification sound. Furthermore, for example, the information display apparatus 400 may output a control signal for causing a lamp to emit light thereby notifying an error. Provision of the information display apparatus 400 having such a function makes it possible for the user to recognize an occurrence of an error even when the user is not looking at the display unit 404.

As described above, the information display apparatus 400 according to the present embodiment obtains information regarding a plurality of apparatuses for obtaining a plurality of images that are captured from a plurality of directions and that are used for generating a virtual viewpoint image according to the specified viewpoint. Furthermore, the information display apparatus 400 identifies an apparatus in an abnormal state among the plurality of apparatuses based on the obtained information. The information display apparatus 400 then causes the display unit 404 to display information indicating one or a plurality of apparatuses, among the plurality of apparatuses, which are in a predetermined relationship with the apparatus in the abnormal state. Thus, for example, even when a large number of apparatuses are included in the image processing system, the user can easily know the influence of the abnormality of the apparatuses included in the system. The information display apparatus 400 can switch between displaying and non-displaying for each piece of information, for example, such that only a connection group is displayed or only an imaging target area group is displayed. Thus, when there are a large number of image capturing apparatuses 100-x and/or there are a large number of groups in the image processing system, unnecessary information is not displayed, and thus an improvement in visibility is achieved.

In the above embodiment, the description has been focused on the case where the information display apparatus 400 displays information regarding the image capturing apparatuses 100-x, but the embodiment is not limited to this case. That is, the information display apparatus 400 according to the present embodiment may display, in addition to or instead of the information regarding the image capturing apparatuses 100-x, information regarding other components included in the system for generating the virtual viewpoint image. For example, the information display apparatus 400 displays the states of the processing apparatus that transmits an image based on imaging by the image capturing apparatus 100-x, the network device such as a switch, a router, and the like, the distribution apparatus 500, the image generation apparatus 200, and the synchronization apparatus. That is, the information display apparatus 400 is capable of displaying an image indicating a state of a component of the system for generating a virtual viewpoint image. Furthermore, when a component of the system is in an abnormal state, the information display apparatus 400 may display information indicating the range influenced by the abnormality such as information indicating other components influenced by the component in the abnormal state.

The present embodiment has been described above by way of example mainly for the case in which the information display apparatus 400 detects an occurrence of a change in the state of the image capturing apparatus 100-x based on the content of the state information output from the image capturing apparatus 100-x. However, the embodiment is not limited to the example described above. For example, the image capturing apparatus 100-x may periodically transmit state information in a normal state. If the information display apparatus 400 does not receive the state information from the image capturing apparatus 100-x for a period with a predetermined length of time, the information display apparatus 400 may determine that the image capturing apparatus 100-x is in an error state.

Description is given in the present embodiment mainly for a case in which when the information display apparatus 400 determines that an apparatus in the image processing system such as an image capturing apparatus 100-x is in an error state, the information display apparatus 400 displays information indicating a group including the apparatus in the error state. However, information displayed by the information display apparatus 400 is not limited to information in terms of the error state. When it is determined that an apparatus in the image processing system is in an abnormal state, such as a warning state warning that there is a high probability that a malfunction occurs, the information display apparatus 400 may display information indicating a group including the apparatus in the abnormal state. By displaying a group including an apparatus in the warning state, for example, it becomes possible for the user to recognize an influence of an error before the error actually occurs in the apparatus and to take preventive measures depending on the degree of the influence.

Furthermore, the present embodiment has been described above also for the case in which information regarding the states of the components of the system for generating the virtual viewpoint image is displayed, but the system may be applied to other systems. For example, in a monitoring camera system including a plurality of cameras as components thereof, information indicating states of cameras may be displayed. Furthermore, information may be displayed in terms of a group of cameras capturing the same area as the camera in the abnormal state, a group of cameras installed in the same area as the camera in the abnormal state, and the like.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A display control apparatus comprising:
one or more memories storing instructions; and
one or more processors executing the instructions to:
specify an apparatus that is in an error state among a plurality of apparatuses to obtain images for use in generating a virtual viewpoint image; and
cause a display apparatus to display a map image including an object representing an apparatus and an object representing an installation area of the apparatus, wherein, in a case where an apparatus in the error state is specified, in the map image, a displayed form of an object representing an apparatus in the error state is made different from a displayed form of an object representing another apparatus that is not in the error state, and a displayed form of an object representing the installation area in which the apparatus in the error state is installed is made different from a displayed form of an object representing another installation area in which the apparatus in the error state is not installed.

2. The display control apparatus according to claim 1, wherein
a plurality of daisy chains in which the plurality of apparatuses are connected are further displayed in the map image, wherein each of the plurality of apparatuses is connected to another apparatus by any of the plurality of daisy chains.

3. The display control apparatus according to claim 1, wherein the apparatus in the error state is an apparatus whose parameter relating to a state of the apparatus is out of a predetermined range.

4. The display control apparatus according to claim 1, wherein the apparatus in the error state is an apparatus whose parameter relating to a state of the apparatus is different from those of a plurality of other apparatuses.

5. The display control apparatus according to claim 1, wherein the apparatus in the error state is an apparatus that is not synchronized with another apparatus.

6. The display control apparatus according to claim 1, wherein an apparatus that is in a state in which communication is not possible is specified as the apparatus in the error state.

7. The display control apparatus according to claim 1,
wherein the one or more processors further execute the instructions to obtain information relating to an imaging parameter from the plurality of apparatuses,
wherein the apparatus in the error state is specified based on the obtained information.

8. The display control apparatus according to claim 1,
wherein the one or more processors further execute the instructions to obtain information relating to a temperature from the plurality of apparatuses,
wherein the apparatus in the error state is specified based on the obtained information.

9. The display control apparatus according to claim 1, wherein the one or more processors further execute the instructions to obtain identification information of the plurality of apparatuses from the plurality of apparatuses.

10. The display control apparatus according to claim 1,
wherein the one or more processors further execute the instructions to obtain information indicating that communication is possible from the plurality of apparatuses,
wherein the apparatus in the error state is specified based on the obtained information.

11. The display control apparatus according to claim 1,
wherein the one or more processors further execute the instructions to obtain information relating to a state of an output from the plurality of apparatuses,
wherein the apparatus in the error state is specified based on the obtained information.

12. The display control apparatus according to claim 1, wherein information representing the installation area in which the apparatus in the error state is installed is displayed in the map image in a different display manner from information representing the installation area in which the apparatus in the error state is not installed.

13. The display control apparatus according to claim 1, wherein the object representing the installation area in which the apparatus in the error state is installed is displayed in the map image by a different color from the object representing the other installation area in which the apparatus in the error state is not installed.

14. A display control method comprising:
specifying an apparatus that is in an error state among a plurality of apparatuses to obtain images for use in generating a virtual viewpoint image; and
causing a display apparatus to display a map image including an object representing an apparatus and an object representing an installation area of the apparatus, wherein, in a case where an apparatus in the error state is specified, in the map image, a displayed form of an object representing the apparatus in the error state is made different from a displayed form of an object representing another apparatus that is not in the error state, and a displayed form of an object representing an area in which the apparatus in the error state is installed is made different from a displayed form of an object representing another area in which the apparatus in the error state is not installed.

15. A non-transitory computer-readable storage medium storing a computer program for causing a computer to execute a display control method comprising:

specifying an apparatus that is in an error state among a plurality of apparatuses to obtain images for use in generating a virtual viewpoint image; and causing a display apparatus to display a map image including an object representing an apparatus and an object representing an installation area of the apparatus, wherein, in a case where an apparatus in the error state is specified, in the map image, a displayed form of an object representing the apparatus in the error state is made different from a displayed form of an object representing another apparatus that is not in the error state, and a displayed form of an object representing an area in which the apparatus in the error state is installed is made different from a displayed form of an object representing another area in which the apparatus in the error state is not installed.

* * * * *